(12) United States Patent
Toyoshima et al.

(10) Patent No.: US 11,141,804 B2
(45) Date of Patent: Oct. 12, 2021

(54) POWER TOOL

(71) Applicant: KOKI HOLDINGS CO., LTD., Tokyo (JP)

(72) Inventors: Yuuichi Toyoshima, Ibaraki (JP); Takeru Kumakura, Ibaraki (JP); Yoshitaka Sekine, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 22 days.

(21) Appl. No.: 16/463,808

(22) PCT Filed: Oct. 27, 2017

(86) PCT No.: PCT/JP2017/038896
§ 371 (c)(1),
(2) Date: May 23, 2019

(87) PCT Pub. No.: WO2018/100940
PCT Pub. Date: Jun. 7, 2018

(65) Prior Publication Data
US 2020/0180050 A1    Jun. 11, 2020

(30) Foreign Application Priority Data

Nov. 30, 2016 (JP) .............................. JP2016-233509
Apr. 28, 2017 (JP) .............................. JP2017-090361

(51) Int. Cl.
*B23D 45/04* (2006.01)
*B27B 5/29* (2006.01)
(Continued)

(52) U.S. Cl.
CPC .............. *B23D 45/044* (2013.01); *B27B 5/29* (2013.01); *B23D 45/048* (2013.01); *B23D 47/12* (2013.01); *B23D 59/006* (2013.01); *B25F 5/008* (2013.01)

(58) Field of Classification Search
CPC .... B23D 45/044; B23D 47/12; B23D 45/048; B23D 45/046; B23D 45/028; B27B 5/29; B27B 5/20; Y10T 83/7693
(Continued)

(56) References Cited

U.S. PATENT DOCUMENTS 2,737,213 A * 3/1956 Richards .................. B27B 9/00
30/376
3,454,061 A * 7/1969 Okoniewski ........... B27D 5/006
144/134.1
(Continued)

FOREIGN PATENT DOCUMENTS

CN          2880336 Y    3/2007
CN       102256753 A   11/2011
(Continued)

OTHER PUBLICATIONS

Chinese Office Action issued in corresponding Chinese Patent Application No. 201780074021.X, dated Mar. 9, 2020, with English translation.
(Continued)

*Primary Examiner* — Ghassem Alie
(74) *Attorney, Agent, or Firm* — McDermott Will & Emery LLP

(57) ABSTRACT

A power tool includes a motor; a fan configured to be rotated by the motor to generate a cooling air; a housing accommodating therein the motor and the fan and defusing an air passage for the cooling air; an output shaft rotatable by the motor; and a transmission mechanism configured to transmit rotation of the motor to the output shaft. An end bit being attachable to and detachable from the output shaft. The transmission mechanism includes an intermediate shaft provided in the housing, a first belt transmitting a rotational force of the motor to the intermediate shaft, a second belt transmitting a rotational force of the intermediate shaft to the
(Continued)

output shaft, and a rotation member transmitting a rotational force of the second belt to the output shaft. The first belt and the second belt are positioned inside a space through which the cooling air passes.

12 Claims, 18 Drawing Sheets

(51) Int. Cl.
  *B23D 47/12* (2006.01)
  *B23D 59/00* (2006.01)
  *B25F 5/00* (2006.01)

(58) Field of Classification Search
  USPC ..... 83/471, 471.2, 477.2, 477, 54, 185, 591, 83/490, 471.3, 522.11, 648, 62.1, 76, 74, 83/665, 666, 471.1, 663; 144/48.2, 48.3, 144/48.6
  See application file for complete search history.

(56) References Cited

U.S. PATENT DOCUMENTS

| | | | | |
|---|---|---|---|---|
| 4,620,367 | A * | 11/1986 | Tubesing | B27B 17/0016 30/122 |
| 4,694,721 | A * | 9/1987 | Brickner, Jr. | B23D 47/12 30/388 |
| 5,348,102 | A * | 9/1994 | Roberson | A01D 34/84 172/15 |
| 5,425,294 | A * | 6/1995 | Ushiwata | B23D 45/044 83/468.3 |
| 5,634,274 | A | 6/1997 | Ohkouchi et al. | |
| 6,233,831 | B1 * | 5/2001 | Iida | B23D 59/006 30/124 |
| 7,628,102 | B2 * | 12/2009 | Kamiya | B23D 59/006 125/13.01 |
| 7,644,645 | B2 * | 1/2010 | Gass | B27B 5/38 83/62.1 |
| 7,770,501 | B2 * | 8/2010 | Ozawa | B23D 45/044 83/473 |
| 2006/0042442 | A1 * | 3/2006 | Ushiwata | B23D 45/048 83/473 |
| 2008/0011140 | A1 * | 1/2008 | Choi | B23D 47/12 83/491 |
| 2009/0260498 | A1 * | 10/2009 | Imamura | B23D 45/048 83/663 |
| 2011/0214546 | A1 | 9/2011 | Inayoshi et al. | |
| 2011/0308828 | A1 * | 12/2011 | Shinma | B25D 17/20 173/114 |
| 2012/0313464 | A1 | 12/2012 | Fukuoka et al. | |
| 2014/0084718 | A1 | 3/2014 | Naito et al. | |
| 2016/0303667 | A1 * | 10/2016 | Marinov | B23D 47/12 |

FOREIGN PATENT DOCUMENTS

| | | |
|---|---|---|
| CN | 102820718 A | 12/2012 |
| CN | 103659459 A | 3/2014 |
| EP | 1260299 A1 | 11/2002 |
| EP | 2366483 A1 | 9/2011 |
| EP | 2689879 A1 | 1/2014 |
| GB | 2504277 A | 1/2014 |
| JP | S60-76913 A | 5/1985 |
| JP | H08-336803 A | 12/1996 |
| JP | 2010-274392 A | 12/2010 |
| JP | 2014-104547 A | 6/2014 |
| JP | 2015-221540 A | 12/2015 |
| WO | 2016/158129 A1 | 10/2016 |

OTHER PUBLICATIONS

Supplementary European Search Report issued in corresponding European Patent Application No. 17876106.0, dated Jun. 26, 2020.
International Preliminary Report on Patentability and Written Opinion issued in corresponding International Patent Application No. PCT/JP2017/038896, dated Jun. 4, 2019, with English translation.
International Search Report issued in corresponding International Patent Application No. PCT/JP2017/038896, dated Jan. 16, 2018, with English Translation.
Chinese Office Action issued in corresponding Chinese Patent Application No. 201780074021.X, dated May 14, 2021, with English translation.

* cited by examiner

POWER TOOL

CROSS-REFERENCE OF RELATED APPLICATIONS

This application is the U.S. National Phase under 35 U.S.C. § 371 of International Patent Application No. PCT/JP2017/038896, filed on Oct. 27, 2017, which in turn claims the benefit of Japanese Application No. 2017-090361, filed Apr. 28, 2017, and Japanese Application No. 2016-233509, filed on Nov. 30, 2016, the entire disclosures of which Applications are incorporated by reference herein.

TECHNICAL FIELD

The present invention relates to a power tool.

BACKGROUND ART

A power tool such as a miter saw has a final decelerating portion including a plurality of metal gears which are meshed with each other, as a part of the power transmission mechanism from a motor to a saw blade. The final decelerating portion is positioned immediately before a rotation shaft of a circular saw. The final decelerating portion is accommodated in the gear case, and the gear case is sealed in order to prevent lubricant such as grease from leaking out of the gear case.

CITATION LIST

Patent Literature

Japanese Patent Application Publication No. 2014-104547

SUMMARY OF INVENTION

Technical Problem

In the above power tool, heat generated by the meshing engagement of the gears is accumulated in the gear case because the gear case is sealed. Accordingly, there is some possibility that damage and deterioration to the components may be promoted due to increase in temperature. Further, because the gear case is sealed, the components such as gears accommodated inside and generating heat cannot be directly exposed to an airflow and cooled. Thus, the power tool has the configuration that it is difficult to cool the components accommodated in the gear case and dissipate heat from the components.

In order to solve the above problems, an object of the present invention is to provide a power tool facilitating cooling with respect to components accommodated in a gear case.

Solution to Problem

A power tool according to the present invention includes a motor, a fan configured to be rotated by the motor to generate a cooling air, a housing accommodating therein the motor and the fan and defining an air passage for the cooling air, an output shaft rotatable by the motor, an end bit being attachable to and detachable from the output shaft; and a transmission mechanism configured to transmit rotation of the motor to the output shaft. The transmission mechanism includes a rotation member configured to be rotated integrally with the output shaft, the rotation member being positioned in the air passage.

With this structure, the cooling air directly impinges on the rotation member to cool the rotation member, so that heat dissipation from the rotation member can be efficiently performed, and degradation of the rotation member can be restrained.

Preferably, the housing includes a case accommodating therein the rotation member. The case has an intake port through which the cooling air is drawn into the case, and an outlet port through which the cooling air is discharged outside the case. The case provides a space between the intake port and the outlet port, and the air passage includes the space where the rotation member is positioned.

Preferably, the rotation member is a pulley, and the transmission mechanism includes a belt configured to transmit rotation of the motor to the pulley. With this structure, an amount of lubrication oil for the driving of the output shaft can be reduced, and leakage of the lubrication oil from the case can be restrained.

Preferably, the pulley is a toothed pulley, and the belt is a toothed belt. With this structure, the toothed belt is reliably engaged with the toothed pulley to transmit rotation of the motor to the toothed pulley. Accordingly, the rotation of the motor can be securely transmitted to the output shaft.

Preferably, the transmission mechanism further includes a first pulley configured to rotate in synchronization with the motor, an intermediate shaft provided in the housing, a second pulley and a third pulley, each of the second pulley and the third pulley being rotatable about an axis of the intermediate shaft. The belt includes a first belt looped over the first pulley and the second pulley, and a second belt looped over the third pulley and the rotation member. The first pulley, the second pulley, the third pulley, the first belt, and the second belt are positioned inside the air passage. With this structure, all of the pulleys and the belts can be cooled with the cooling air.

Preferably, the outlet port is formed in the case at a position facing the end bit, so that the cooling air is discharged toward the end bit. With this configuration, the discharged cooling air passes along the end bit and then impinges on the workpiece, so that the discharged cooling air functions as a blower air for cutting dust, thereby improving visibility to the workpiece during operation.

Preferably, a working space is defined between the case and a workpiece to be machined by the end bit. The outlet port is formed in the case at a position facing the working space, and the cooling air is discharged toward the working space. With this configuration, the discharged cooling air produces an airflow in the working space to function as a blower air for cutting dust, thereby improving visibility to the workpiece during operation.

Preferably, the intake port is open to a space in the housing, and the housing has an air introduction opening. The air passage is in communication with the air introduction opening and extends to the outlet port through the intake port. The air introduction opening is positioned opposite to the outlet port with respect to the output shaft. This structure prevents the discharged cooling air heated by waste heat from again being introduced into the housing through the air introduction opening and from being recirculated in the housing.

Preferably, the intake port and the outlet port are formed on opposite sides of the case in a direction parallel to a rotation axis of the rotation member.

Preferably, the rotation member is positioned between the outlet port and the intake port in a direction parallel to or perpendicular to the rotation axis of the rotation member.

Further, a power tool according to the present invention includes a motor having a rotation shaft, a fan configured to be rotated by the motor to generate a cooling air, a housing accommodating therein the motor and the fan and defining an air passage for the cooling air, an output shaft rotatable by the motor, an end bit being attachable to and detachable from the output shaft, an intermediate shaft rotatably positioned in the housing, a first transmission mechanism configured to transmit rotation of the motor to the intermediate shaft; and a second transmission mechanism configured to transmit rotation of the intermediate shaft to the output shaft. The first transmission mechanism has an adjacent portion adjacent to the intermediate shaft, and the second transmission mechanism has an adjacent portion adjacent to the output shaft, the adjacent portions being positioned in the air passage to be exposed to the cooling air.

With this structure, even if heat generated in the working area of the end bit is transferred to the second transmission mechanism through the end bit and the output shaft, these components are cooled by the cooling air, thereby prolonging service life of these components.

Preferably, the first transmission mechanism includes a first rotation member rotatable integrally with the rotation shaft, a second rotation member provided integrally with the intermediate shaft and rotatable in accordance with rotation of the first rotation member, and a first belt looped over the first rotation member and the second rotation member, and the second transmission mechanism includes a third rotation member rotatable integrally with the intermediate shaft, a fourth rotation member provided integrally with the output shaft and rotatable in accordance with rotation of the third rotation member, and a second belt looped over the third rotation member and the fourth rotation member.

With this structure, the second rotation member and the fourth rotation member those generating a large amount of heat due to the rotation of the motor can be cooled, so that degradation of the second rotation member and the fourth rotation member can be restrained.

Preferably, the housing includes a case accommodating therein the second transmission mechanism and a part of the intermediate shaft. The case has an intake port through which the cooling air is drawn into the case, and an output port through which the cooling air is discharged outside of the case. The air passage is formed by the cooling air flowing from the intake port to the outlet port by rotation of the fan, the second rotation member and the fourth rotation member being positioned in the air passage.

With this structure, the air heated in the case can be discharged through the outlet port, thereby efficiently cooling the second transmission mechanism and ensuring dust proof performance with respect to the case.

Preferably, the fan is provided to the rotation shaft, and the housing has an air introduction opening. The air passage is formed by the cooling air flowing from the air introduction opening to the intake port by rotation of the fan, the motor being positioned in the air passage.

With this structure, by making use of the airflow generated by the fan attached to the rotation shaft of the motor, the first and second transmission mechanisms can be cooled, while preferentially performing cooling to the motor.

Preferably, the fan is provided to at least one of the intermediate shaft and the output shaft.

With this structure, a strong cooling air is generated in the vicinity of the intermediate shaft by the provision of the fan at the intermediate shaft, so that the components of the first and second transmission mechanisms near the intermediate shaft can be efficiently cooled. Further, a strong cooling air is generated in the vicinity of the output shaft by the provision of the fan at the output shaft, so that the components of the second transmission mechanism near the output shaft cab be efficiently cooled. Further, the first and second transmission mechanisms can be more efficiently cooled by the provision of the fans at the intermediate shaft and the output shaft. Particularly, the cooling effect to the third rotation member can be enhanced. Further, an increased amount of the airflow can be generated in the housing by the two fans, thereby improving cooling effect.

Preferably, each of the first rotation member, the second rotation member, the third rotation member, and the fourth rotation member is a pulley, and at least one of the second rotation member and the fourth rotation member includes a hollow cylindrical portion, a shaft portion and a plurality of blades extending between the shaft portion and the hollow cylindrical portion and arrayed in a circumferential direction with a gap between neighboring blades. The plurality of blades functions as the fan upon rotation of the plurality of blades.

With this structure, at least one of the second rotation member and the fourth rotation member functions as the fan to generate a cooling air, so that numbers of components in the housing can be reduced and the housing can have a compact size.

Preferably, the third and fourth rotation members are toothed pulleys, and the second belt is a toothed belt. With this structure, in accordance with the rotation of the toothed pulley, the motor can be cooled by the airflow generated by the rotation of the plurality of blades provided in the pulley. Consequently, attachment of the fan to the output shaft of the motor is not required, thereby downsizing the motor housing.

Preferably, the housing further includes a motor housing accommodating therein the motor, and an air introduction opening through which the motor housing is communicated with outside. The air passage is formed by the cooling air flowing inside the motor housing from the air introduction opening by rotation of the fan. The motor is positioned in the air passage.

With this structure, the cooling air for cooling the motor can be generated without a fan provided to the output shaft of the motor. Therefore, a compact motor housing can be realized.

Preferably, the air passage is formed so as to extend from the air introduction opening to the outlet port through the motor housing by rotation of the fan. The air introduction opening is at a position opposite to the outlet port with respect to the output shaft.

This structure can prevent the cooling air heated by the waste heat released from the motor from again entering the housing through the air introduction opening and from recirculation in the housing.

Preferably, the outlet port is formed in the housing at the position facing the end bit, so that the cooling air is discharged toward to the end bit.

With this structure, because the discharged airflow travelling along the end bit impinges on the workpiece, the discharged airflow functions as a blower air blowing away cutting dust, thereby improving visibility to the workpiece during operation.

Preferably, a working space is defined between the case and a workpiece to be machined by the end bit. The outlet port is provided in the case so as to face the working space, so that the cooling air can be discharged toward the working space.

With this structure, the discharged cooling air in the working space functions as a blower air blowing away the cutting dust, thereby improving visibility during operation.

Preferably, the power tool includes a base portion having a mounting surface on which a workpiece is configured to be mounted, a support portion pivotably movably supporting the housing toward and away from the mounting surface, and a tilting mechanism including a tilting shaft extending along the mounting surface, the tilting mechanism being configured to tilt the housing with respect to the mounting surface about the tilting shaft. The output shaft is orthogonal to the tilting shaft.

With this structure, no fan is attached to the rotation shaft of the motor, so that the motor housing accommodating the motor can be compact in size. Accordingly, a tilting range of the housing with respect to the mounting surface of the base can be increased, thereby improving cutting performance of the power tool.

Preferably, the fan is a motor fan attached to the rotation shaft of the motor. With this structure, a plurality of fans are provided in the housing, so that cooled targets positioned in the vicinity of the fan can be cooled by the strong cooling air. Accordingly, the first and second transmission mechanisms and the motor can be efficiently cooled.

Preferably, the fan is a motor fan attached to the rotation shaft of the motor. The air passage includes a motor cooling air passage formed by the cooling air flowing from the air introduction opening and flowing through the housing by rotation of the motor fan to cool the motor. The air passage also includes a transmission mechanism cooling air passage formed by the cooling air flowing from the intake port to the outlet port to cool the second rotation member and the fourth rotation member. The motor cooling air passage and the transmission mechanism cooling air passage are independent of each other.

With this structure, the first and second transmission mechanisms and the motor are cooled by airflows different from each other, respectively. Accordingly, the air heated by the motor does not reach the transmission mechanism, thereby performing efficient cooling to the transmission mechanism.

Preferably, the intake port and the discharge port are positioned on opposite sides of the case in a direction parallel to the output shaft.

Preferably, the first belt and the second belt are positioned in the air passage. This configuration allows the first and second transmission mechanisms as a whole to be disposed in the air passage. Hence, the first and second transmission mechanisms can be efficiently cooled.

Advantageous Effects of Invention

According to the power tool of the present invention, heat dissipation from the transmission mechanism can be performed, and entry of cutting dust into the housing can be obviated.

DESCRIPTION OF EMBODIMENTS

Figure 1:
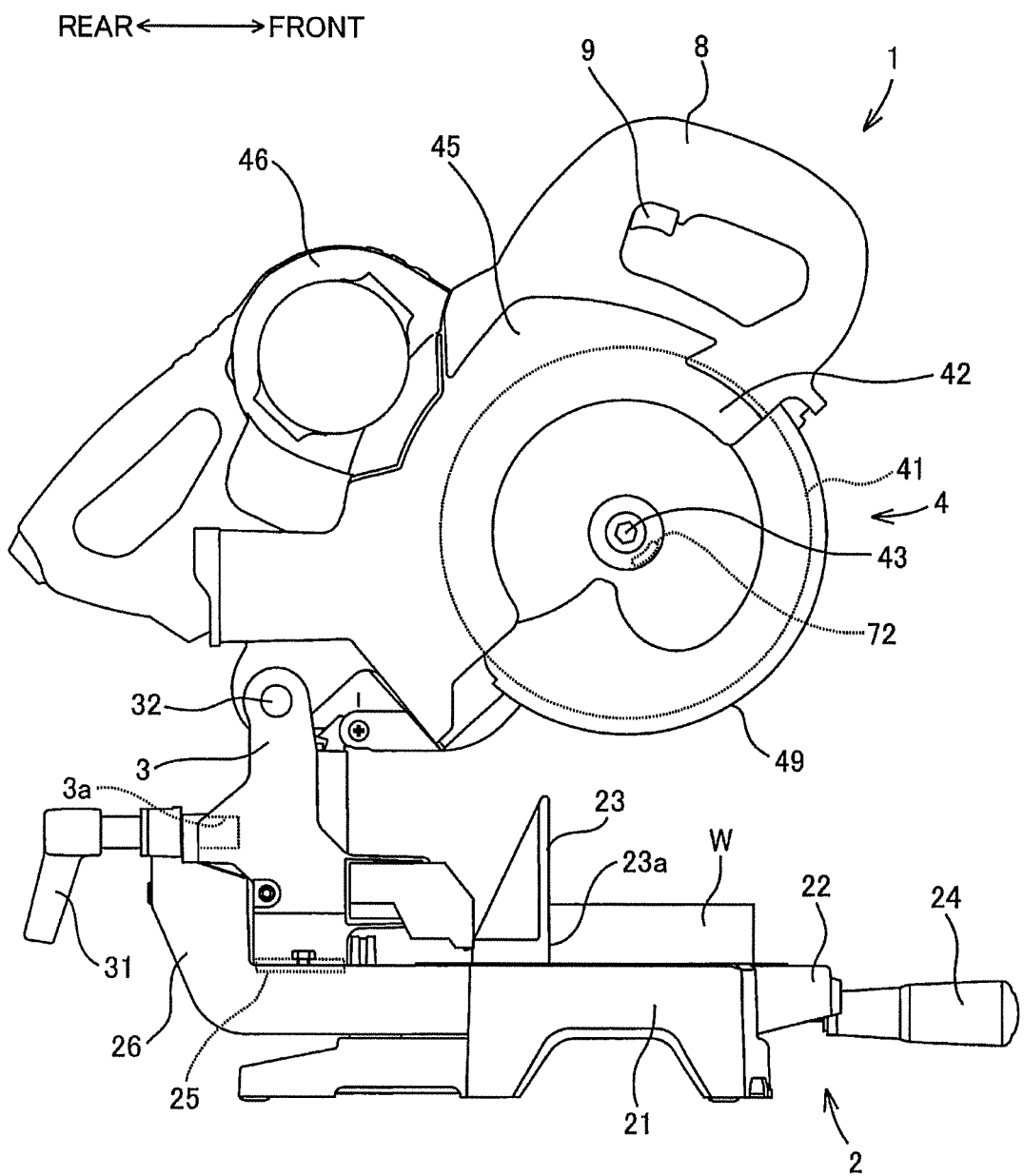
FIG. 1 is a side view of a miter saw according to a first embodiment of the present invention.

A miter saw according to a first embodiment will be described with reference to accompanying drawings. The miter saw is an example of a power tool according to the present invention. As illustrated in FIGS. 1 to 4, a miter saw 1 includes a base portion 2, a holder 3, and a circular saw portion 4. A saw blade 41, as an end bit, having a disc shape is mounted to the circular saw portion 4. The circular saw portion 4 is configured to be tilted in the directions orthogonal to a side surface of the saw blade 41 with respect to the base portion 2 and movable in a direction toward and away from the base portion 2.

The base portion 2 mainly includes a base 21 configured to be disposed on a floor surface, a turntable 22 supported on the base 21, and a fence 23 provided on the base 21. The turntable 22 has a top surface which is substantially flush with a top surface of the base 21. The turntable 22 is coupled to the base 21 and is rotatable about a rotation axis which is orthogonal to the top surface. During operation, a workpiece W is disposed on the base 21 and the turntable 22. Each of the turntable 22 and the base 21 has a groove portion (not illustrated) which allows the saw blade 41 to be inserted therein when the circular saw portion 4 is moved downward. The base 21 and the turntable 22 are example of the mounting surface of the invention.

Figure 3:
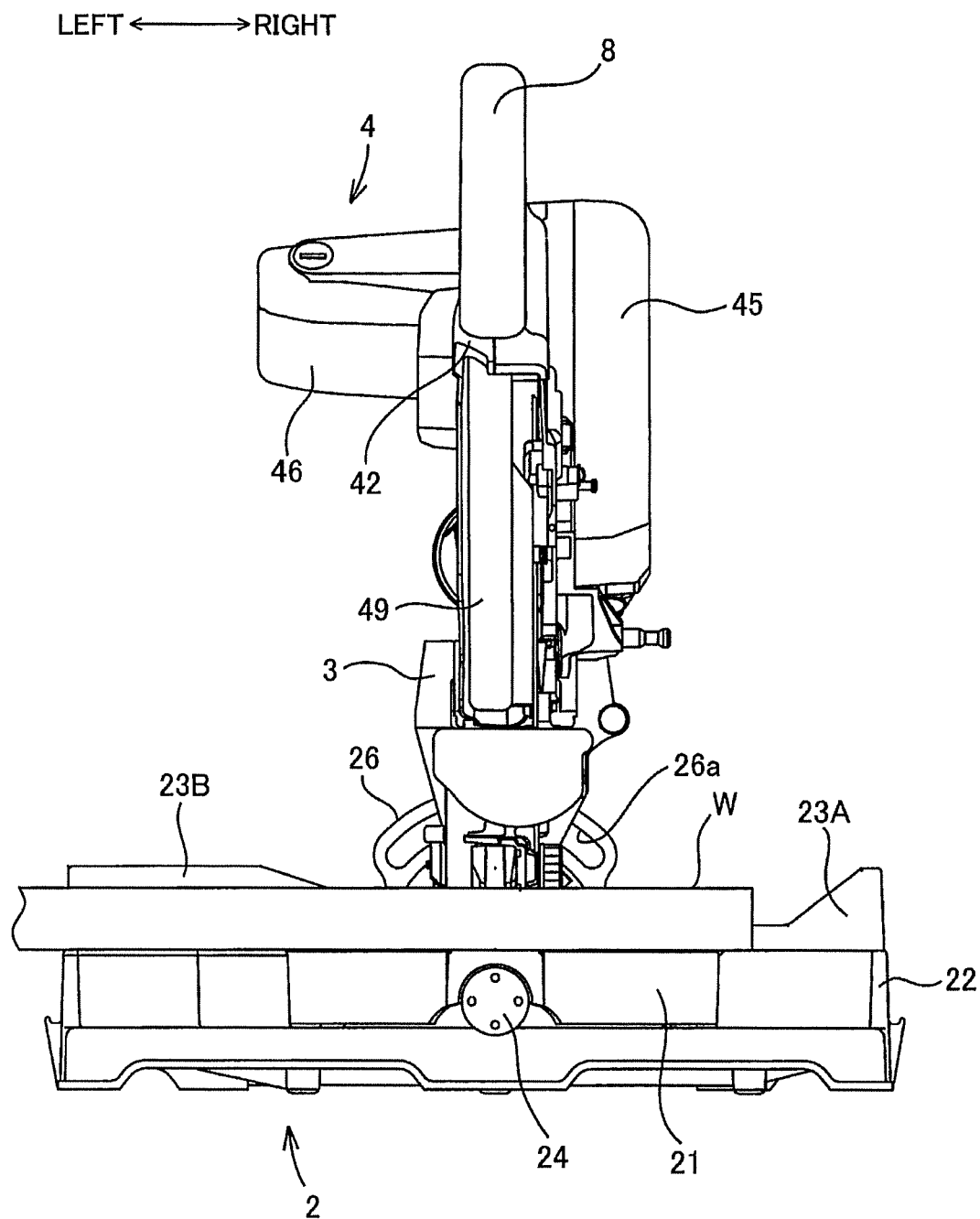
FIG. 3 is a front view of the miter saw illustrated in FIG. 1.

The fence 23 includes a right fence 23A and a left fence 23B with reference to FIG. 3. Each of the right fence 23A and the left fence 23B has a pressing surface 23a which is substantially orthogonal to the top surface of the base 21. During the cutting operation to the workpiece W, one surface of the workpiece W is abutted against the pressing surface 23a of the fence 23.

An operation portion 24 is provided at a front portion of the turntable 22 for rotating and fixing an angular rotational position of the turntable 22. The turntable 22 has a rear portion where a tilting shaft 25 and a protrusion portion 26 are provided. The tilting shaft 25 extends in a frontward/rearward direction in such a manner that a central axis of the tilting shaft 25 is flush with the top surface of the turntable 22. The protrusion portion 26 protrudes upward and has an elongate hole 26a (See FIG. 3) whose profile has an arcuate shape whose arcuate center is coincident with the central axis of the tilting shaft 25.

The holder 3 extends upward at the rear portion of the turntable 22. The holder 3 is an example of a support portion of the invention. The holder 3 includes a lower portion which is pivotally movable about the tilting shaft 25. Accordingly, the holder 3 is pivotally movable in a leftward/rightward direction with respect to the turntable 22. The holder 3 has a threaded hole 3a at the position coincident with the elongate hole 26a described-above. A clump lever 31 is threadingly engaged with the threaded hole 3a. Specially, a male thread portion of the clump lever 31 extends through the elongate hole 26a to be threadingly engaged with the threaded hole 3a. The operation of the clump lever 31 in a releasing direction reduces a pressing force of the clump lever 31 against the surface of the protrusion portion 26, whereupon the holder 3 becomes pivotally movable within a range corresponding to an arcuate length of the elongate hole 26a. On the other hand, the operation of the clump lever 31 in a fixing direction produces a pressing force of the clump lever 31 against the surface of the protrusion portion 26, so that the holder 3 is fixed to the protrusion portion 26 at a desired slant angle, i.e., the holder 3 is fixed with respect to the turntable 22. The above configuration is one example of a tilting mechanism of the invention.

Two stoppers (not illustrated) as a positioning member for fixing a tilted posture of the holder 3 are provided on the side surface portions of the holder 3 which are close to the base portion. Two stopper bolts (not illustrated) are threadingly engaged with and fixed to the top surface of the turntable 22 at a position coincident with a locus of the stoppers. When the holder 3 is tilted with respect to the turntable 22 about the tilting shaft 25, the stopper is brought into contact with a head portion of each of the stopper bolts at a predetermined tilted angle, so that the tilting position of the circular saw portion 4 is settled.

One of the stopper bolts is configured to be abutted on one of the stoppers when the holder 3 is tilted at 45 degrees in the leftward direction. The other stopper bolt is configured to be abutted on the other stopper when the holder 3 is tilted at 45 degrees in the rightward direction. Further, a pivot shaft 32 extending in a direction orthogonal to the side surface of the saw blade 41 is provided in an upper end portion of the holder 3. It should be noted that the tiltable range of the circular saw portion 4 is dependent on a length of the circular saw portion 4 in the tilting direction. The shorter the length of the circular saw portion 4 in the tilting direction is, the wider the tiltable range is accordingly.

Figure 4:
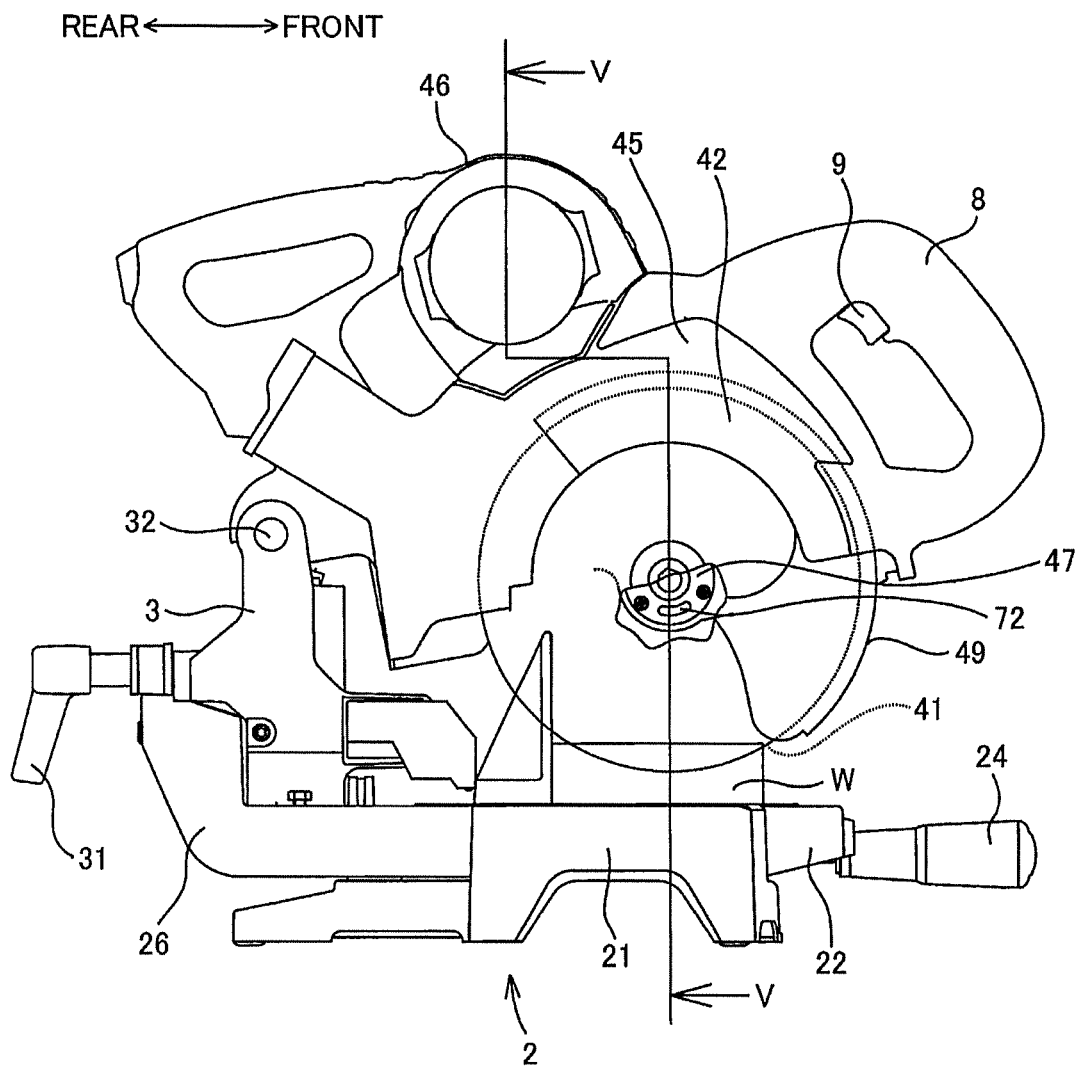
FIG. 4 is a side view of the miter saw performing cutting operation with respect to a workpiece.
Figure 5:
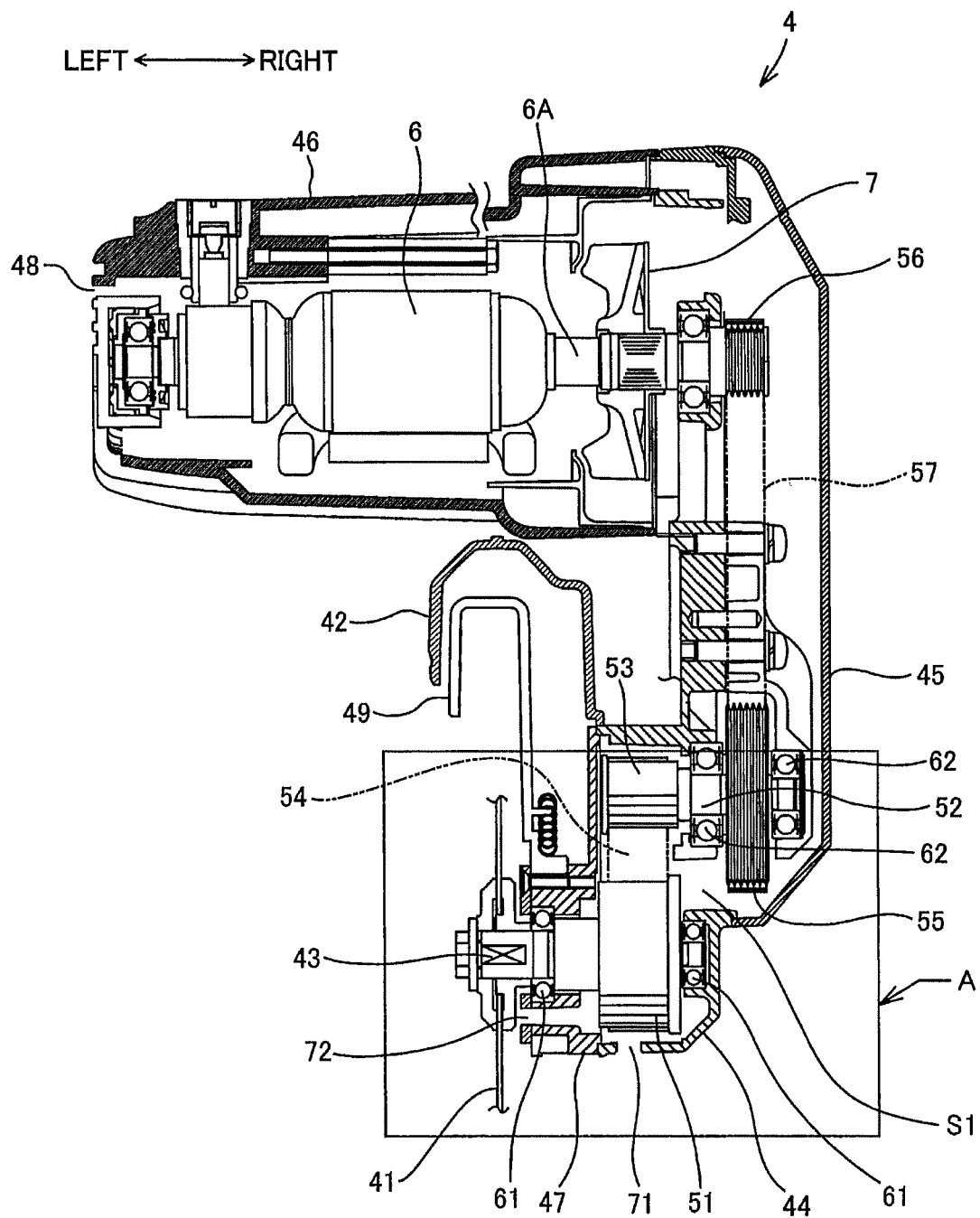
FIG. 5 is a cross-sectional view illustrating a housing of the miter saw taken along a line V-V in FIG. 4.

The circular saw portion 4 is configured to be pivotably moved about the pivot shaft 32 in a direction toward and away from the base portion. FIG. 4 is a side view of the miter saw 1 when the circular saw portion 4 is pivotably moved toward the base portion 2 about the pivot shaft 32 to start cutting the workpiece W. FIG. 5 is a cross-sectional side view of a housing 40 of the circular saw portion 4 of the miter saw 1 according to the first embodiment when the miter saw 1 illustrated in FIG. 4 is taken along the line V-V.

As illustrated in FIG. 5, the housing 40 of the miter saw 1 includes a saw cover 42, a gear case 44, a main housing 45, and a motor housing 46. The saw cover 42 has a shape covering a part of outer periphery of the saw blade 41. The gear case 44 is coupled to the saw cover 42 and has a shape covering a spindle 43 as a rotation center of the saw blade 41. The main housing 45 is coupled to the gear case 44 to accommodate a part of a transmission mechanism 5 described later. The motor housing 46 is coupled to the main housing 45 and has a shape covering a motor 6. When the main housing 45 is pivotably moved about the pivot shaft 32, the circular saw portion 4 is pivotably moved. The spindle 43 is one example of an output shaft of the invention.

A spring (not illustrated) is disposed over the pivot shaft 32. The circular saw portion 4 is pivotably urged by the spring in the direction away from the base portion 2 (upward). Normally, the circular saw portion 4 is positioned at a topmost position illustrated in FIG. 1 by a stopper mechanism (not illustrated). The cutting operation is performed by pivotally moving the circular saw portion 4 downward about the pivot shaft 32 against the urging force of the spring. When the circular saw portion 4 is pivotally moved downward, the saw blade 41 is inserted into the groove portion (not illustrated) formed in the turntable 22. The pivotal movement of the saw blade 41 is stopped by a stopper mechanism (not illustrated) with a predetermined area of the saw blade 41 being inserted in the groove portion.

As illustrated in FIG. 5, the saw blade 41 is supported to the spindle 43 and configured to rotate about the spindle 43 coaxially and integrally with the spindle 43.

Figure 6:
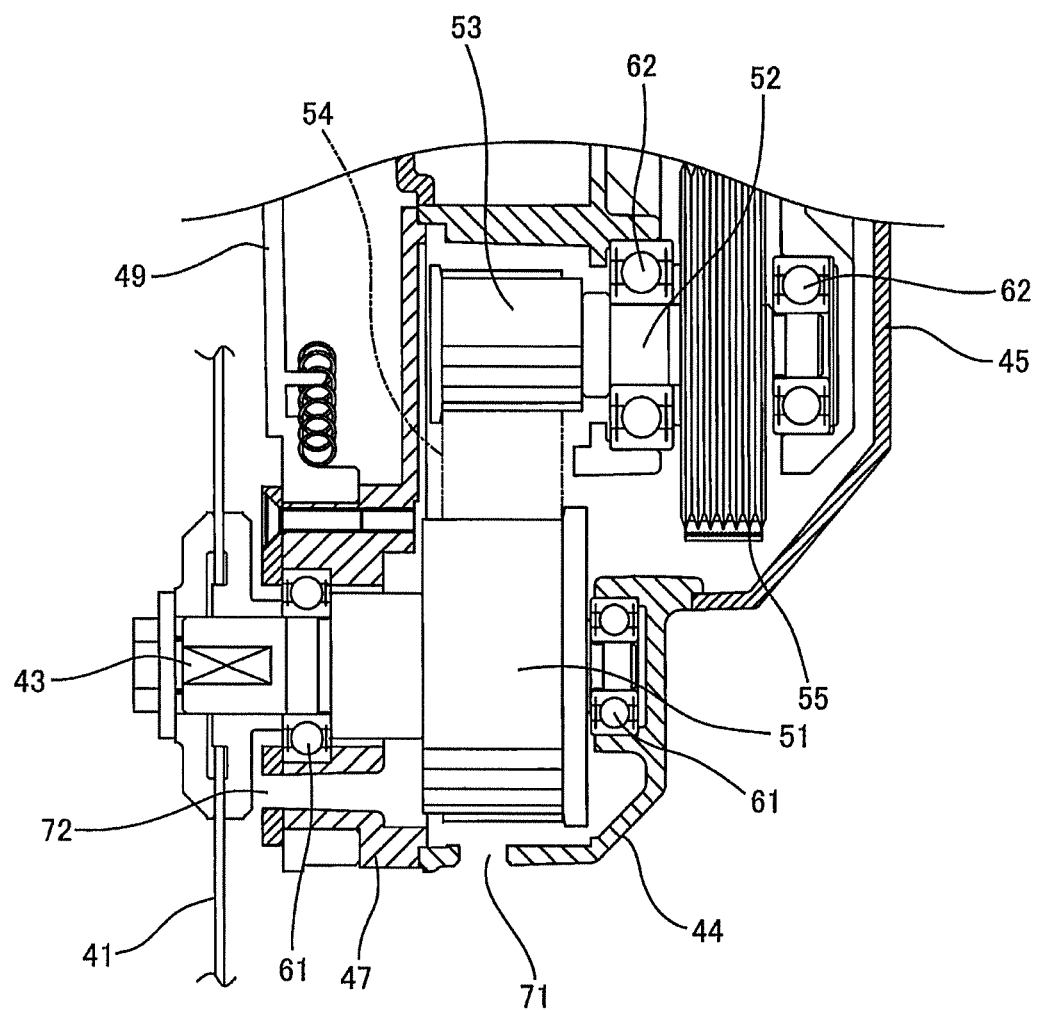
FIG. 6 is an enlarged view of the gear case illustrated in FIG. 5.

As illustrated in FIG. 6, the gear case 44 accommodates a first pulley 51 as a rotation member of the invention, a pulley shaft 52 as an intermediate shaft of the invention, and a second pulley 53. The gear case 44 is one example of a case of the invention. The first pulley 51 is a toothed pulley (timing pulley) having an outer peripheral surface provided with a plurality of teeth arrayed one after another with a predetermined interval. The first pulley 51 is connected coaxially with the spindle 43 and configured to be rotated integrally with the spindle 43. The pulley shaft 52 is disposed parallel to the central axis of the spindle 43 in the gear case 44. The second pulley 53 is provided coaxially with and integrally with the pulley shaft 52 at one end position of the pulley shaft, the one end portion being closer to the saw blade 41 than another end portion of the pulley shaft is to the saw blade. The second pulley 53 is a toothed pulley (timing pulley) having an outer surface provided with a plurality of teeth arrayed one after another with a predetermined interval. More specially, the second pulley 53 has teeth (grooves) extending parallel to the rotation axis of the second pulley 53 and arrayed one after another in a circumferential direction of the second pulley 53.

Further, the first pulley 51 and the second pulley 53 are disposed in such a manner that their outer peripheral surfaces face to each other with an space in the direction extending parallel to the side surface of the saw blade 41. A first belt 54 is looped over the first pulley 51 and the second pulley 53. More specially, the first belt 54 has an inner peripheral surface provided with teeth (grooves) extending in a direction parallel to a circulation axis of the first belt and arrayed one after another in the circumferential direction. Rotation of the second pulley 53 is transmitted to the first pulley 51 by way of the circulating movement of the first belt 54. In this embodiment, the first belt 54 is a teethed belt such as a timing belt. It should be noted that the second pulley 53 is one example of a third rotation member of the invention, the first belt 54 is one example of a second belt of the invention, and the first pulley 51 is one example of a fourth rotation member of the invention. The transmission mechanism including the second pulley 53, the first belt 54, and the first pulley 51 is one example of the second transmission mechanism of the invention.

Further, a first opening 71 is open at an outer peripheral surface portion of the gear case 44. The outer peripheral surface portion faces the workpiece W when mounted on the base portion 2, and is positioned adjacent to the toothed surface of the first pulley 51. The first opening 71 functions as an outlet port so as to communicate an interior of the gear case 44 with an exterior of the gear case 44. The first opening 71 has the shape and dimensions so as to direct the cooling air discharged through the first opening 71 toward the workpiece W. Further, a space defined between the workpiece W and the gear case 44 formed with the first opening 71 is a working space during cutting operation by the saw blade 41.

Figure 2:
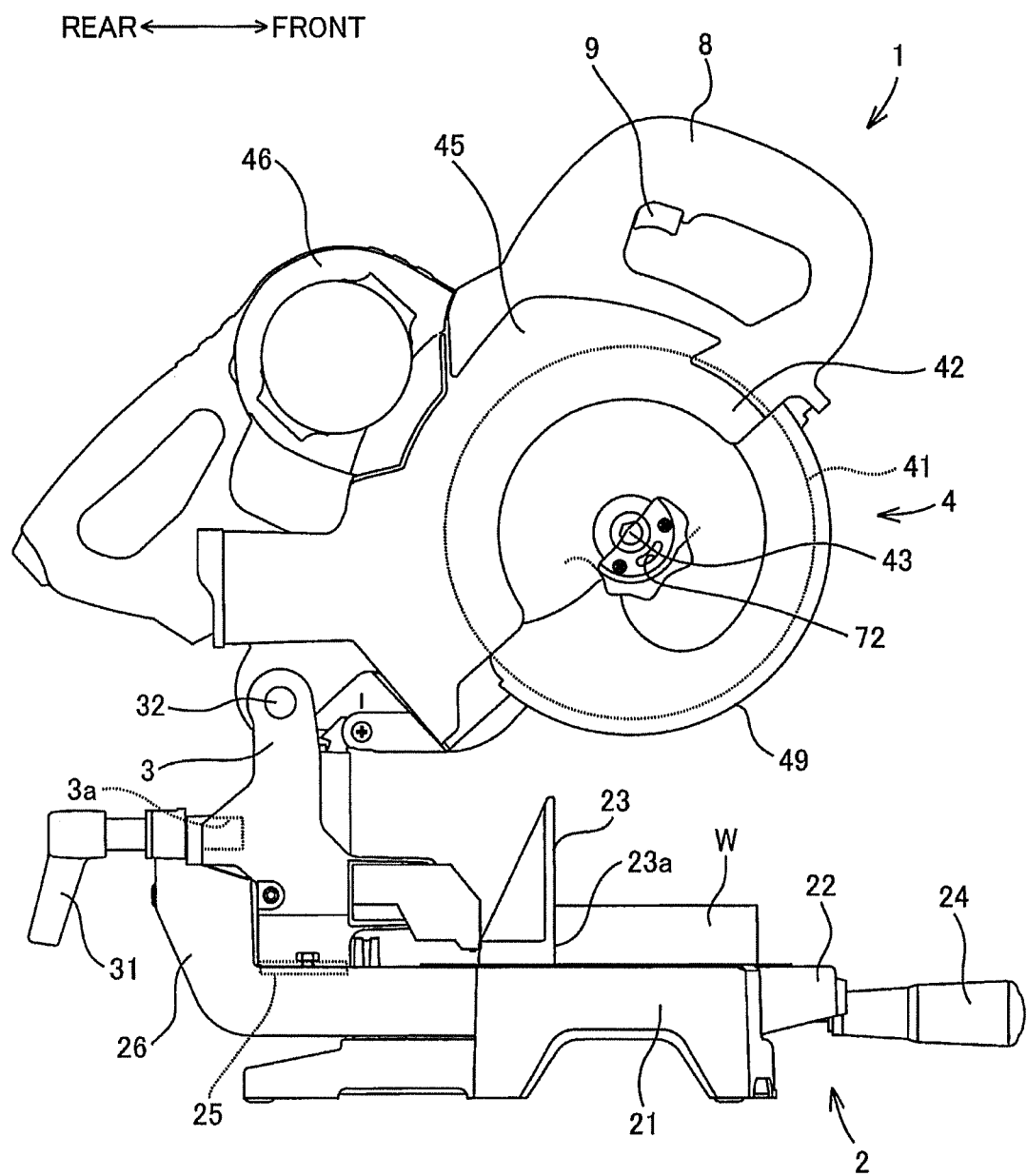
FIG. 2 is a side view illustrating an outlet port formed in a gear case of the miter saw illustrated in FIG. 1.

Further, the spindle 43 is rotatably supported through a bearing 61 to a bearing holder 47 attached to the gear case 44. The spindle 43 protrudes out of the gear case 44, and a tip end portion of the spindle is configured to hold a rotational center portion of the saw blade 41. The bearing holder 47 has a surface portion facing the saw blade, and a second opening 72 is open as an outlet port at the surface portion of the bearing holder 47. The second opening 72 allows the interior of the gear case 44 to communicate with the exterior of the gear case 44. The second opening 72 has the shape and dimensions for directing the cooling air discharged through the second opening 72 toward the saw blade 41. For example, the second opening 72 has an arcuate shape whose arcuate center is coincident with the spindle 43 in the surface portion facing the saw blade 41 as illustrated in FIG. 2. Further, the second opening 72 is formed on the surface portion of the bearing holder 47 facing the saw blade 41 so that the second opening 72 is positioned between the spindle 43 and the base 21 when the circular saw portion 4 is moved downward toward the base portion 2.

As illustrated in FIGS. 5 and 6, the main housing 45 is communicated with the gear case 44 through a communicating space S1, and accommodates a third pulley 55 and a fourth pulley 56 therein. The third pulley 55 is coaxially connected to the pulley shaft 52 at another end portion of the pulley shaft 52 to rotate integrally with the pulley shaft 52. Further, the pulley shaft 52 is rotatably supported to the main housing 45 by means of a bearing 62.

The fourth pulley 56 is coaxially connected to an output shaft 6A of the motor 6 to rotate integrally with the output shaft 6A. The third pulley 55 and the fourth pulley 56 are disposed so that the outer peripheral surfaces of the third pulley 55 and the fourth pulley 56 face to each other in the direction parallel to the side surface of the saw blade 41. A second belt 57 is looped over the third pulley 55 and the fourth pulley 56. The second belt 57 is a toothed belt such as a timing belt. Further, the first pulley 51, the pulley shaft 52, the second pulley 53, the first belt 54, the third pulley 55, the fourth pulley 56, and the second belt 57 constitute the transmission mechanism 5 for transmitting the output of the motor 6 to the saw blade 41.

A V-pulley having a V-shaped groove extending in the circumferential direction on the cylindrical surface may be used as the third pulley 55 and the fourth pulley 56, respectively, for example. In the latter case, the second belt 57 is a V-belt. It is noted that the output shaft 6A of the motor 6 is one example of a rotation shaft of the invention, the fourth pulley 56 is one example of a first rotation member of the invention, the second belt 57 is one example of a first belt of the invention, and the third pulley 55 is one example of a second rotation member of the invention. Further, the transmission mechanism constituted by the fourth pulley 56, the second belt 57, and the third pulley 55 is one example of a first transmission mechanism of the invention. Additionally, the communicating space S1 is one example of an intake port provided in the housing of the invention. Accordingly, the communicating space S1 is positioned at one side of the gear case 44, the one side being closest to the main housing 45. The second opening 72 is positioned at the other side of the gear case 44, the other side being close to the saw blade 41.

The motor housing 46 has a hollow cylindrical shape for accommodating therein the motor 6 and a cooling fan 7. The motor housing 46 has one end in the axial direction which is in communication with the main housing 45. The motor 6 is disposed in such a manner that the output shaft 6A extends toward the main housing 45 in a direction parallel to the spindle 43 which functions as the rotation shaft of the saw blade 41, and the output shaft 6A crosses an imaginary extension line of the side surface of the saw blade 41. The cooling fan 7 is fixed to the output shaft 6A. The rotation force of the motor 6 is transmitted to the fourth pulley 56 which rotates integrally with the output shaft 6A, and then transmitted to the transmission mechanism 5. It is noted that the output shaft 6A is one example of a rotation shaft of the motor of the invention, and the cooling fan 7 is one example of a fan or a motor fan of the invention.

The motor housing 46 has another end portion formed with a plurality of openings each having a slit shape as air introduction openings 48. Ambient air can be drawn into the interior of the motor housing 46 through the air introduction openings 48.

Further, a saw cover 49 having the shape capable of covering an outer peripheral portion of the saw blade 41 which outer peripheral portion protrudes from the saw cover 42 (See FIG. 1) is pivotally movably provided in the saw cover 42. The saw cover 49 is pivotally moved to a position where the saw cover 49 covers the portion of the saw blade 41 protruding out of the saw cover 42 when the circular saw portion 4 is positioned upward as illustrated in FIG. 1. On the other hand, when the circular saw portion 4 is pivotally moved downward, the saw cover 49 is accommodated in the saw cover 42 by means of a link mechanism (not illustrated), and the saw cover 49 is pivotally moved to a position where the outer peripheral portion of the saw blade 41 protruding from the saw cover 42 is exposed to the outside.

A handle portion 8 is provided integrally with the main housing 45 on the line extending from the side surface of the saw blade 41. Further, a switch 9 for controlling the motor 6 is provided in the handle portion 8. By providing the handle portion 8 on the line extending from the saw blade 41, reaction force acting on the circular saw portion 4 through saw blade 41 during the cutting operation (while being pivoted) can be received without causing the circular saw portion 4 to be tilted. Further, a fixing mechanism (not illustrated) is provided for preventing the circular saw portion 4 from being moved with respect to the base portion 2 while the circular saw portion 4 is positioned at the lowermost position. The employment of the fixing mechanism facilitates conveyance of the miter saw.

Operation in the miter saw 1 will next be described. For cutting the workpiece W, the switch 9 provided at the handle portion 8 is operated to rotate the motor 6 for rotating the saw blade 41 about an axis of the spindle 43. In this state, the handle portion 8 is gripped and pressed down for moving the circular saw portion 4 downward against the urging force of the spring to cut the workpiece W. When the saw blade 41 is inserted into the groove of the turntable 22 and the cutting to the workpiece W is completed, the pressing force to the circular saw portion 4 is released, so that the circular saw portion 4 is returned to the original upper limit position by means of the urging force of the spring.

Further, operation of the circular saw portion 4 during operation of the miter saw 1 will be described in details. When the motor 6 is rotated, the fourth pulley 56 is rotated together with the rotation of the output shaft 6A. The rotation of the fourth pulley 56 is transmitted to the third pulley 55 through the second belt 57, thereby rotating the third pulley 55. The second pulley 53 is rotated by the rotation of the third pulley 55. The rotation of the second pulley 53 is transmitted to the first pulley 51 through the first belt 54, thereby rotating the first pulley 51. The spindle 43 is rotated by the rotation of the first pulley 51, thereby rotating the saw blade 41. Accordingly, the saw blade 41 can cut the workpiece W.

Figure 7:
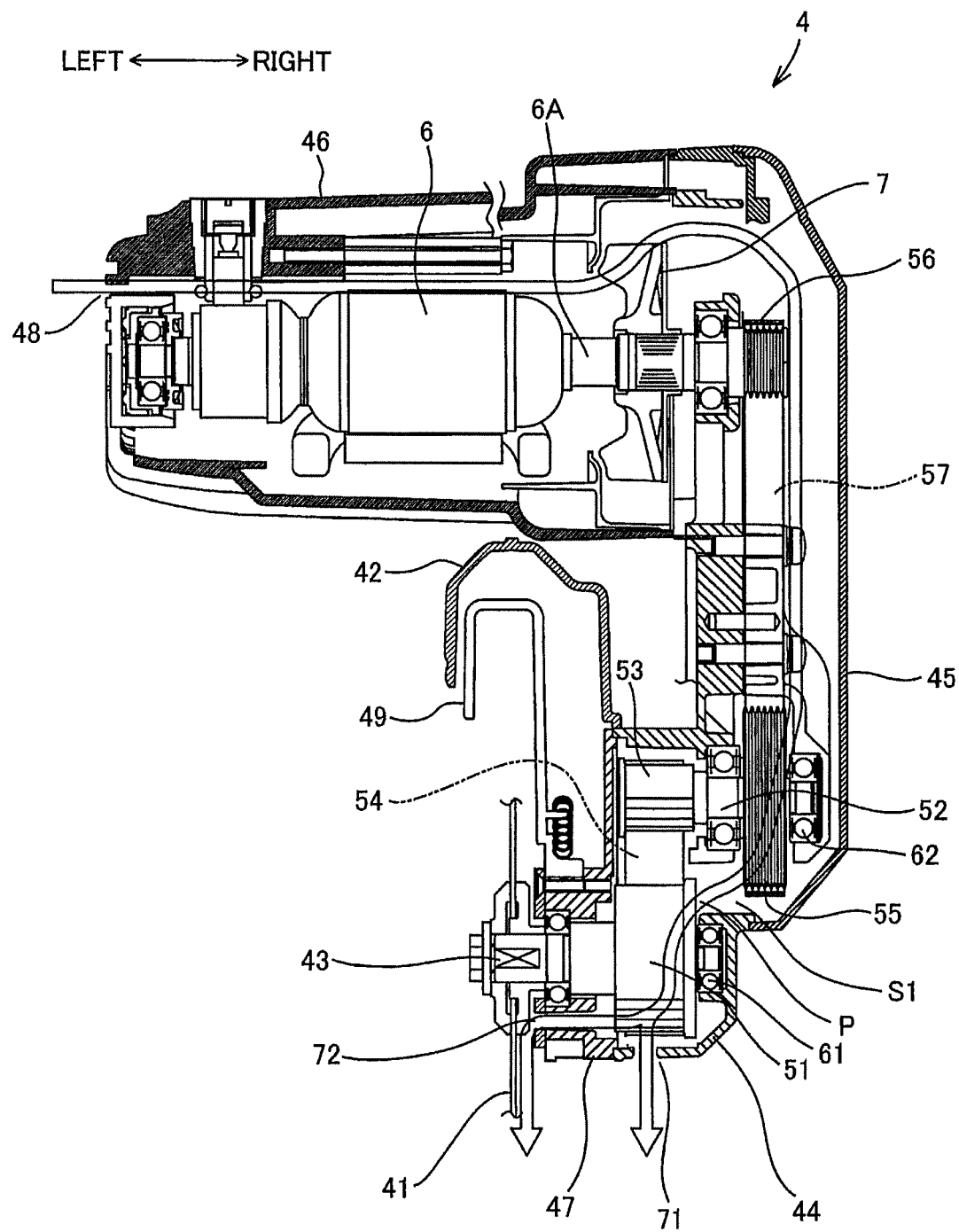
FIG. 7 is a cross-sectional view of an air passage formed in the housing.

At this time, as illustrated in FIG. 7, the rotation of the motor 6 causes rotation of the cooling fan 7, so that external air is drawn into the motor housing 46 through the air introduction openings 48 as the cooling air by the rotation of the cooling fan 7. The motor housing 46 is communicated with the main housing 45. Further, the main housing 45 is communicated with the gear case 44 through the communicating space S1. Accordingly, the cooling air drawn into the motor housing 46 cools the motor 6, then the cooling air flow enters the main housing 45, and passes through and cools the fourth pulley 56, the second belt 57, and the third pulley 55 in this order and those being positioned in the main housing 45. The cooling air then enters the gear case 44 through the communicating space S1, and passes through the second pulley 53, the first belt 54, and the first pulley 51 in this order and those being positioned in the gear case 44. The airflow is then discharged to the outside through the first opening 71 of the gear case 44 and the second opening 72 of the bearing holder 47. At this time, by the cooling air flowing from the communicating space S1 to the second opening 72, the cooling air moves past the second pulley 53, the first belt 54, and the rotation shaft of the first pulley 51 from its one end portion to the other end portion (from the right end to the left end). In other words, the cooling air passes through the space where the first belt 54 is looped over the second pulley 53 and the first pulley 51.

As described above, an air passage P for the cooling air is formed from the air introduction openings 48 to the first opening 71 or the second opening 72 through the motor housing 46, the main housing 45, the communicating space S1, and the gear case 44. The first to fourth pulleys 51, 53, 55, and 56 and the first and second belts 54 and 57 those constituting the transmission mechanism 5 are disposed in the air passage P. Accordingly, the first to fourth pulleys 51, 53, 55, and 56, and the first and second belts 54 and 57 are directly cooled by the cooling air, thereby dissipating heat generated in the above components during their driving. Particularly, the first pulley 51 and the first belt 54 are disposed in the air passage P to be directly exposed to the cooling air, so that heat generated in the transmission mechanism 5 due to the operation of the miter saw 1 can be efficiently dissipated. Consequently, degradation of the components constituting the transmission mechanism 5 including the first pulley 51 and the first belt 54 which are subjected to the heaviest loads among the components in the transmission mechanism can be restrained, thereby prolonging service life of the miter saw 1. Further, an entire power transmission path from the motor 6 to the saw blade 41 can be cooled, because the cooling air is configured to pass through all rotating members such as the motor 6 and the saw blade 41 in addition to the transmission mechanism 5 during the cutting operation.

Further, the cooling air is discharged outside through the second opening 72 of the bearing holder 47 and the first opening 71 of the gear case 44 which first opening is close to the saw blade 41. At this time, the cooling air discharged from the second opening 72 impinges on the side surface of the saw blade 41 and then changes the traveling direction. Additionally, the impinged cooling air which is directed toward the air introduction openings 48 is blocked by the spindle 43. Therefore, the cooling air discharged outside from the first opening 71 and the second opening 72 flows mainly in a direction away from the air introduction openings 48. Consequently, this configuration efficiently prevents the discharged air absorbing the heat generated in the transmission mechanism 5 from being directed to the air introduction openings 48, thereby restraining circulation of the cooling air (discharged air). Further, even if cutting chip generated by cutting the workpiece W approaches the first opening 71 and the second opening 72, ejection force of the discharged air flowing through the first opening 71 and the second opening 72 prevents the cutting chip from entering the gear case 44 through the first and second openings. Specially, because a plurality of the opening portions (first opening 71 and the second opening 72) functioning as the outlet ports are formed, an opening area per each opening portion can be reduced. Further, the plurality of opening portions are oriented to directions different from each other, so that entry of cutting chip into the gear case 44 can be restrained more efficiently. Further, since the first opening 71 and the second opening 72 are provided in the lower portion of the gear case 44, dust which may be deposited in the lower portion of the gear case 44 due to the force of gravity can be suitably discharged by the discharged airflow flowing through the first opening 71 and the second opening 72. Particularly, since the first opening 71 is opened downward, dust or chip can be discharged more efficiently. Further, before starting the operation, the airflow discharged from the second opening 72 is guided along the side surface of the saw blade 41 to reach an end portion (blade edge) of the saw blade 41. Accordingly, dust or chip attached to the saw blade 41 including the blade edge can be removed by the discharged airflow, thereby restraining degradation of the cutting performance.

Further, because the first opening 71 and the second opening 72 through which the cooling air is discharged are moved close to the workpiece W during cutting operation, the cooling air discharged from the first opening 71 and the second opening 72 impinges on the workpiece W and blows away cutting chip. Hence, visibility to the cutting portion by the saw blade 41 can be improved. In other words, the cooling air discharged from the first opening 71 and the second opening 72 can be used as a blower air with respect to the cutting chip. Further, because the discharged airflow is directed away from the air introduction openings 48, cutting chip floating in an ambient air is also moved away from the air introduction openings 48. Thus, entry of cutting chip into the motor housing 46 can be restrained.

Further, the communicating space S1 functioning as the intake port and the second opening 72 functioning as the outlet port are positioned remote from each other in a direction orthogonal to the axial direction of the spindle 43. And, the spindle 43, the first pulley 51, a part of the first belt 54, and the bearing 61 are disposed between the communicating space S1 and the second opening 72 in the direction orthogonal to the axial direction of the spindle 43. Therefore, the cooling air moves past from one end to another end of the first pulley 51, one end facing the second pulley 53 and the other end being opposite to the one end (the cooling air moves in the upward/downward direction along the first pulley in the drawings). Hence, the spindle 43, the first pulley 51, the part of the first belt 54, and the bearing 61 can be efficiently cooled. Further, the communicating space S1 functioning as the intake port and the second opening 72 functioning as the outlet port are positioned remote from each other in a direction parallel to the axial direction of the spindle 43. Therefore, the cooling air moves past the second pulley 53, the first belt 54, and the rotation shaft of the first pulley 51 from its one end portion to the other end portion (from the right end to the left end), and the cooling air flow also moves past from the one end to the other end of the first pulley 51, the one end facing the second pulley 53 and the other end being opposite to the one end (the cooling air moves in the upward/downward direction in the drawings along the first pulley in the drawings). Hence, the spindle 43, the first pulley 51, the second pulley 53, the first belt 54, and the bearing 61 can be efficiently cooled. Further, the cooling air passes through the space where the first belt 54 is looped over the first pulley 51 and the second pulley 53. In other words, the cooling air crosses the first belt 54 in a direction crossing the running direction of the first belt 54. Accordingly, even if frictionally wearing particles is released from the first belt 54 by the friction due to the working load and the particles is adhered to the second pulley 53 and the first pulley 51, the particles can be removed from the pulleys by the cooling air flowing across the first belt 54 from the right side to the left side. Particularly, the first pulley 51 and the second pulley 53 thobe being timing pulleys have grooves extending in a direction parallel to the rotation shaft (extending in leftward/rightward direction). Accordingly, the cooling air flowing along the grooves can efficiently remove the dust and particles adhered in the grooves.

Further, the air introduction openings 48 through which the cooling air is drawn, and the first opening 71 and the second opening 72 through which the cooling air is discharged outside of the gear case 44 are provided remote from each other. This configuration can avoid recirculation of the discharged airflow flowing through the air passage P, that is, this configuration can prevent the cooling air discharged from the first opening 71 and the second opening 72 from re-introducing into the housing through the air introduction openings and flowing through the air passage P. Fresh external air not containing the heated waste air can be introduced into the housing, thereby efficiently cooling the transmission mechanism 5.

Further, because the meshing engagement of gears is not utilized in order to transmit rotation of the motor 6 to the saw blade 41, usage of grease which is indispensable for meshing engagement of the gears, and hermetical sealing to the gear case 44 for preventing leakage of the grease are not required. Therefore, the downsizing of the gear case 44 can be realized, and openings can be formed in the gear case 44 itself. Hence, the first pulley 51 provided integrally with the spindle 43 can be exposed to the cooling air, thereby improving cooling efficiency for cooling the transmission mechanism 5.

Further, an output of the motor 6 is transmitted to the saw blade 41 by using the belts 54 and 57 instead of the meshing engagement of the gears, so that the volume of the transmission mechanism 5 occupied in the housing can be reduced to reduce the weight of the transmission mechanism 5, and the air passage P for the cooling air can have an increased area in the housing. Additionally, the meshing engagement of the gears made from metal is omitted, so that generation of noise can be reduced.

It is noted that the first opening 71 may be positioned at any position in the gear case 44 other than the position in the above-described embodiments as long as cooling to the first pulley 51 by the cooling air is achievable.

In the above embodiment, the first opening 71 and the second opening 72 are formed as the outlet ports for the cooling air. However, either one of the first opening 71 and the second opening 72 may be omitted.

Further, in the above embodiment, the bearing holder 47 is formed separately from the gear case 44. However, the bearing holder 47 may be formed integrally with the gear case 44.

Although the embodiment of the present invention has been described, it is understood that the invention should not be limited to the above-described embodiment and that various changes and modifications may be made without departing from the spirit and scope defined in the appended claims. Further embodiments of the present invention will be described.

Figure 8:
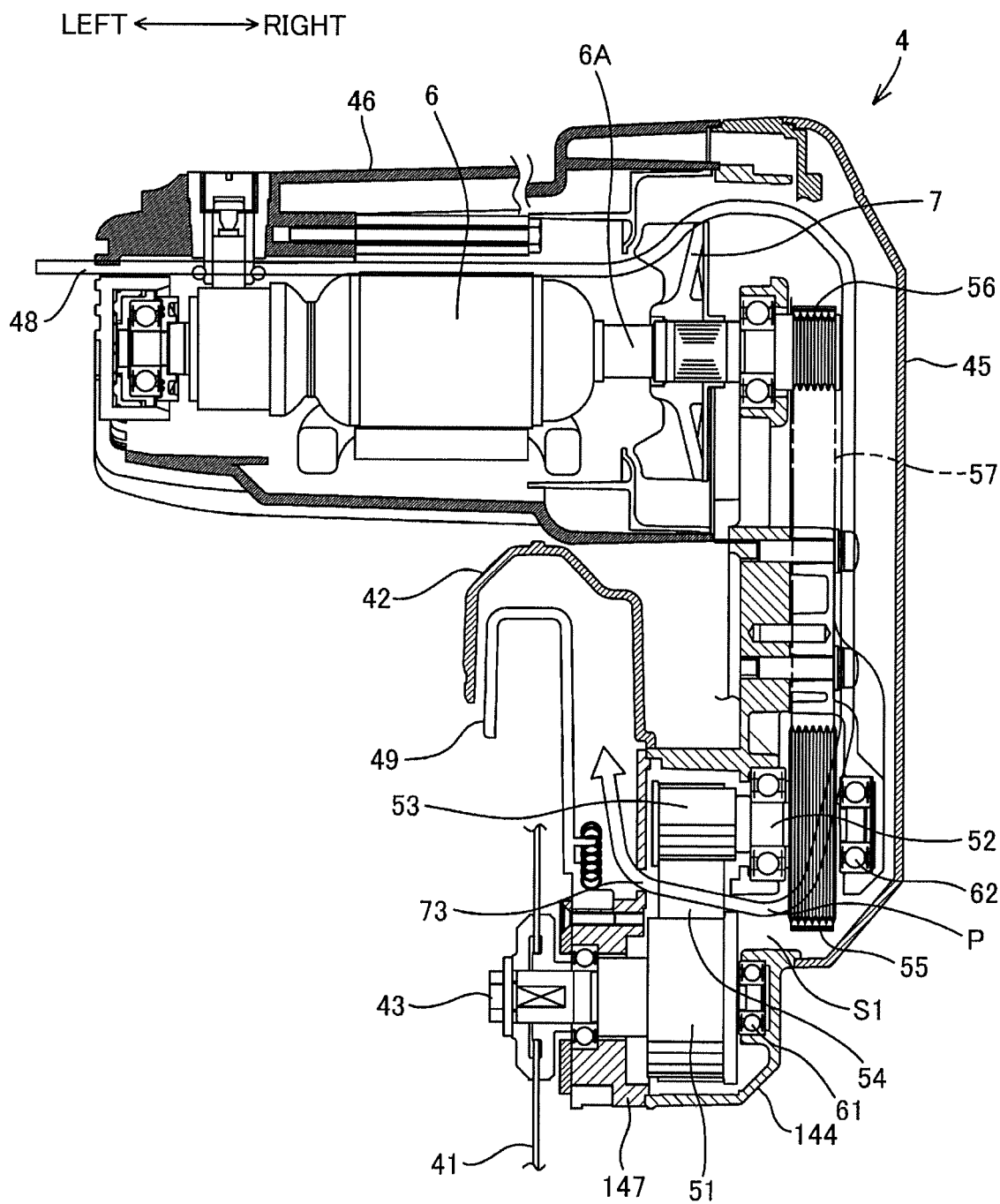
FIG. 8 is a cross-sectional view of an air passage formed in a housing of a miter saw according to a second embodiment of the present invention.

FIG. 8 illustrates a housing of a miter saw according to a second embodiment of the present invention. In the second embodiment, like parts and components are designated by the same reference numerals as those shown in FIGS. 1 through 7.

The housing illustrated in FIG. 8 differs from the housing according to the above-described embodiment with reference to FIGS. 1-7 in that the first opening 71 and the second opening 72 are omitted whereas a third opening 73 is formed. The third opening 73 as an outlet port is open at a portion of the gear case 44, the portion facing the saw blade 41. The third opening 73 allows communication between an inside and outside of the gear case 44. The third opening 73 is positioned at an end portion of the gear case 44 at a position between the first pulley 51 and the second pulley 53 in a direction parallel to the side surface of the saw blade 41. Further, the third opening 73 is positioned to face a space in the gear case 44 where the first belt 54 is looped over the first pulley 51 and the second pulley 53. Further, the third opening 73 is positioned to face the communicating space S1, so that the cooling air passing through the communicating space S1 can directly reach the third opening 73. For example, the third opening 73 is open to the saw blade 41 at a surface of the bearing holder 47, and has an arcuate shape whose arcuate center is coincident with an axis of the spindle 43.

In this embodiment, after the cooling air passes through the communicating space S1, the cooling air moves past the space where the first belt 54 is looped between the first belt 51 and the second belt 53 in a direction from right to left, and is then discharged outside through the third opening 73. In other words, the air passage P is formed from the communicating space S1 to the third opening 73 through the portion between the first pulley 51 and the second pulley 53.

Accordingly, in this embodiment, the communicating space S1 and the third opening 73 are remote from each other in a direction parallel to the axial direction of the spindle 43. And, each of the communicating space S1 and the third opening 73 is disposed between a center axis of the pulley shaft 52 and a center axis of the spindle 43. Consequently, the cooling air in the gear case 44 can intensively pass through the portion between the first pulley 51 and the second pulley 53. Therefore, even if wearing particles is released from the first belt 54 due to friction by the working load and then the wearing particles is adhered to the second pulley 53 and the first pulley 51, the wearing particles can be effectively removed by the cooling air flowing across the first belt 54 in the direction from right to left. Particularly, the first pulley 51 and the second pulley 53 those being the toothed pulleys have grooves extending in a direction parallel to the rotation shaft thereof (leftward/rightward direction). Therefore, the cooling air can be guided along the grooves, so that dust adhered on the grooves of the first pulley 51 and the second pulley 53 can be removed in a more appropriate manner.

A housing of a miter saw according to a third embodiment of the Invention will next be described with reference to FIGS. 9 through 11, wherein like parts and components are designated by the same reference numerals as those shown in the first embodiment to avoid duplicating description.

Figure 9:
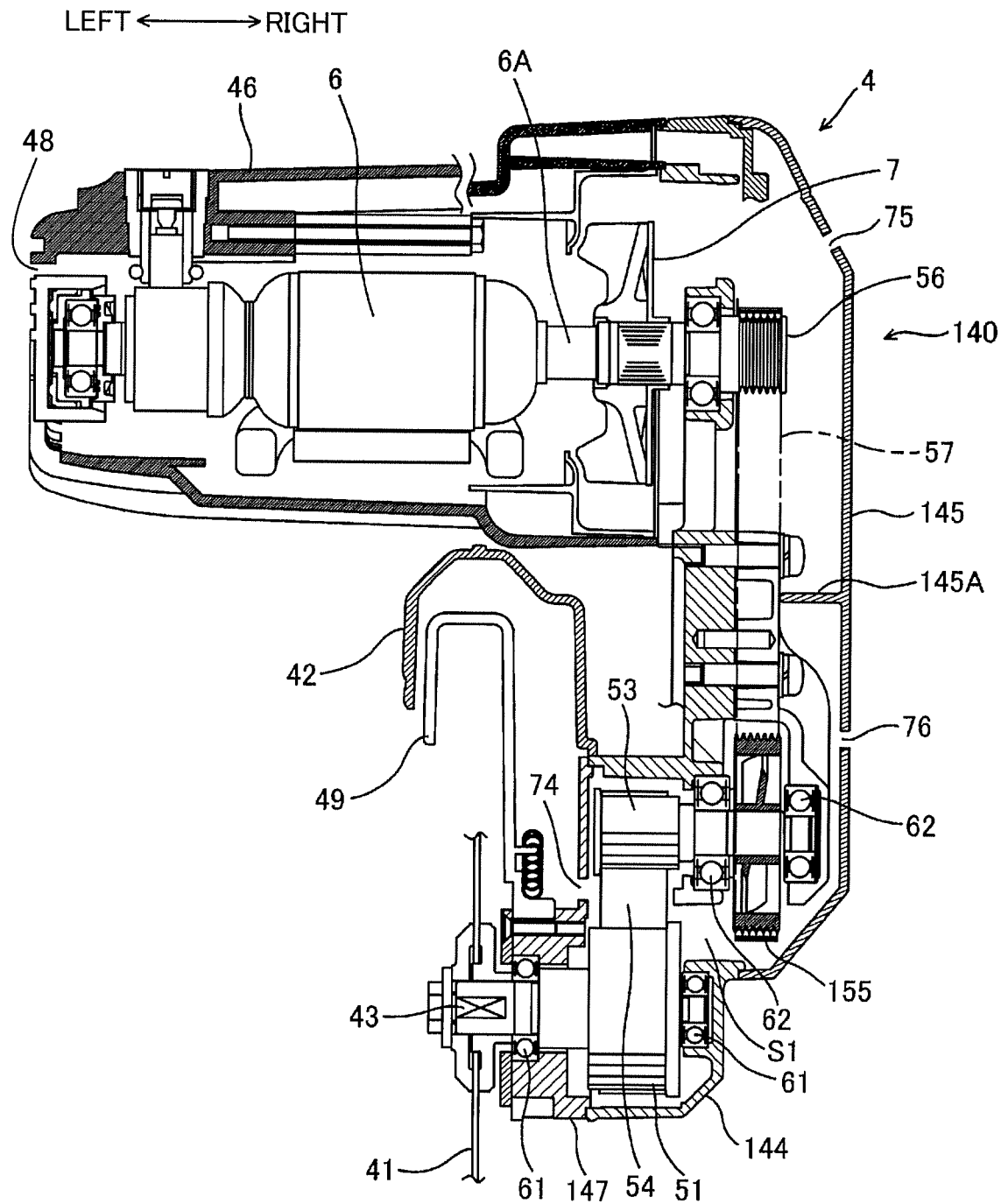
FIG. 9 is a cross-sectional view of a housing of a miter saw according to a third embodiment of the present invention.
Figure 10:
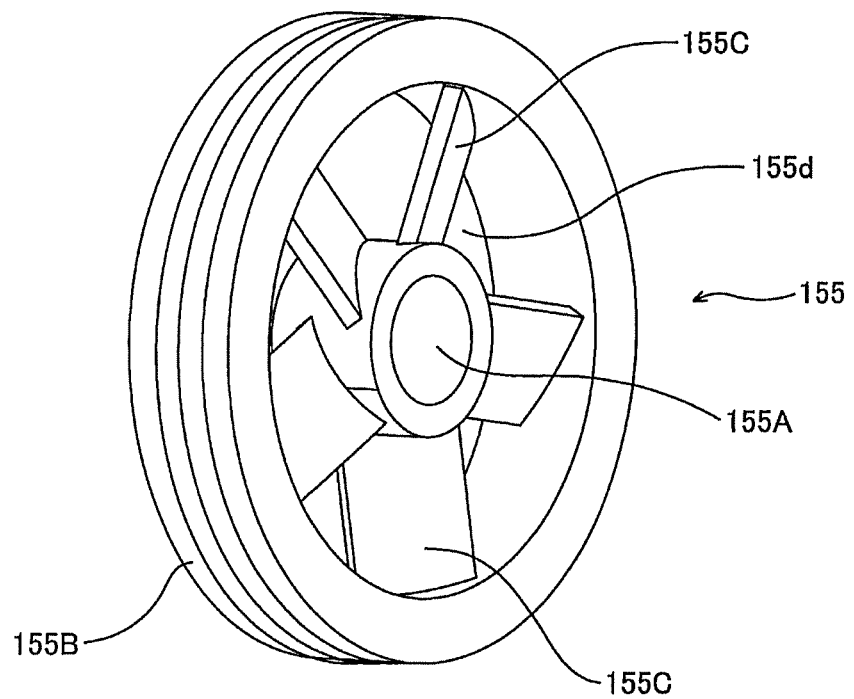
FIG. 10 is a perspective view of a V-pulley functioning as an axial fan.

As illustrated in FIG. 9, a housing 140 includes the saw cover 42, a gear case 144, a main housing 145, and the motor housing 46. The saw cover 42 has a shape for covering a part of the saw blade 41. The gear case 144 is coupled to the saw cover 42 and has a shape for covering the spindle 43 as the rotational center of the saw blade 41. The main housing 145 is coupled to the gear case 144 and accommodates therein a part of the transmission mechanism 5. The motor housing 46 is coupled to the main housing 145 and has a shape for covering the motor 6.

The gear case 144 has an outer surface facing the saw blade 41, where a fourth opening 74 is positioned. The fourth opening 74 functions as the outlet port and is configured to communicate the interior of the gear case 144 with the exterior of the gear case 144. The fourth opening 74 is positioned between the first pulley 51 and the second pulley 53 as viewed from the outer surface of the gear case 144. Further, the fourth opening 74 is positioned to face a space of the gear case 144 where the first belt 54 is looped over the first pulley 51 and the second pulley 53. Further, the fourth opening 74 is at the position facing the communicating space S1 so that the cooling air passing through the communicating space S1 can directly reach the fourth opening 74. For example, the fourth opening 74 is open at a surface of a bearing holder 147 facing the saw blade 41, and has an arcuate shape whose arcuate center is coincident with the spindle 43.

The main housing 145 has a fifth opening 75 at the position facing the motor 6 and a sixth opening 76 at the position facing the pulley shaft 52. A partition wall 145A protrudes inward from an inner surface of the main housing 145 facing the transmission mechanism 5. The partition wall 145A is at a substantially intermediate position between the third pulley 155 and the fourth pulley 56. The partition wall 145A is provided at the position such that where a motor cooling air passage W1 and a transmission mechanism cooling air passage W2 can be independent of each other, i.e., the partition wall is positioned to avoid mixture of the motor cooling air passage W1 with the transmission mechanism cooling air passage W2. The motor cooling air passage W1 is produced in the motor housing 46 by rotation of the cooling fan 7. The transmission mechanism cooling air passage W2 is produced in the gear case 144. The partition wall 145A has a dimension capable of the motor cooling air passage W1 and the transmission mechanism cooling air passage W2 being independent of each other.

In this embodiment, each of a third pulley 155 and the fourth pulley 56 is a V-pulley, and the second belt 57 is a toothed pulley. Particularly, the third pulley 155 includes a core portion 155A, a hollow cylindrical portion 155B, and a plurality of blades 155C as illustrated in FIG. 10. The core portion 155A is coaxially fixed to the pulley shaft 52. The second belt 57 is looped over the hollow cylindrical portion 155B. The plurality of blades 155C are positioned between the hollow cylindrical portion 155B and the core portion 155A, and are arrayed in the circumferential direction with a gap between neighboring blades. The hollow cylindrical portion 155B has an outer surface where V-shaped grooves extending in the circumferential direction is formed. At least two V-shaped grooves are positioned side by side in a direction of the rotation axis.

Each of the plurality of blades 155C extends in a radial direction and spans between the core portion 155A and the hollow cylindrical portion 155B. The plurality of blades 155C are arrayed in the circumferential direction with the gap 155*d* between neighboring blades. The plurality of blades 155C have shapes to function as an axial fan in accordance with the rotation of the plurality of blades 155C about an axis of core portion 155A. The blades generate an airflow passing through the gaps 155*d* and directed to the second pulley 53. Numbers and shape of the blades 155C are appropriately designed depending on an intended intensity of the cooling air generated by the third pulley 155 as the axial fan.

In this embodiment, in accordance with the rotation of the motor 6, the fourth pulley 56 is rotated together with the rotation of the output shaft 6A. The rotation of the fourth pulley 56 is transmitted to the third pulley 155 through the second belt 57, thereby rotating the third pulley 155. The second pulley 53 is rotated together with the rotation of the third pulley 155. The rotation of the second pulley 53 is transmitted to the first pulley 51 through the first belt 54, thereby rotating the first pulley 51. The spindle 43 is rotated together with the rotation of the first pulley 51, thereby rotating the saw blade 41. Consequently, the saw blade 41 can cut the workpiece W.

Figure 11:
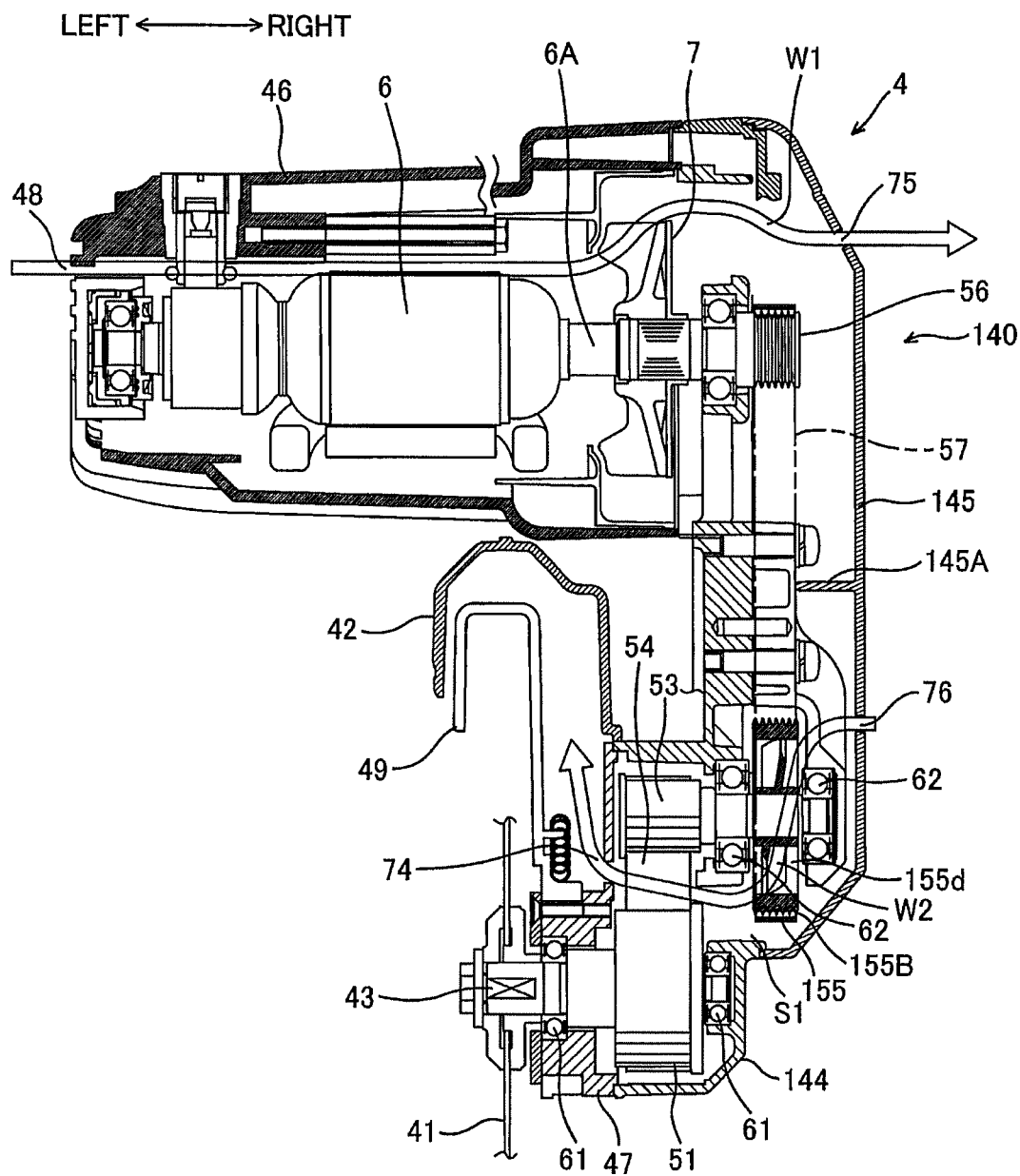
FIG. 11 is a cross-sectional view illustrating an air passage formed in the housing illustrated in FIG. 9.

At this time, as illustrated in FIG. 11, because the cooling fan 7 is rotated in accordance with the rotation of the motor 6, external air is drawn into the motor housing 46 through the air introduction openings 48 as the cooling air. The cooling air flows into the main housing 145 from the motor housing 46. However, the cooling air is blocked from entering the communicating space S1 by the partition wall 145A, so that the cooling air is discharged outside of the housing 140 through the fifth opening 75. In other words, the motor cooling air passage W1 is created from the air introduction openings 48 to the fifth opening 75 in the housing 140. The motor 6, the fourth pulley 56, and a part of the second belt 57 those positioned in the motor cooling air passage W1 can be cooled by the cooling air flowing in the motor cooling air passage W1.

Further, the third pulley 155 functions as the axial fan upon rotation to generate the airflow directing to the second pulley 53. Accordingly, external air is drawn through the sixth opening 76 as the cooling air. The drawn cooling air passes through the gaps 155*d* in the hollow cylindrical portion 155B of the third pulley 155, passes through the space between the first pulley 51 and the second pulley 53, and is discharged outside of the housing 140 through the fourth opening 74. In other words, the transmission mechanism cooling air passage W2 extending from the sixth opening 76 is created. The third pulley 155, a part of the first pulley 51, and a part of the second pulley 53 are located in the transmission mechanism cooling air passage W2. The cooling air passing through the transmission mechanism cooling air passage W2 moves past the third pulley 155, the first pulley 51, the second pulley 53, a part of the first belt 54, and the bearing 61, and is discharged outside through the fourth opening 74 of the gear case 144.

At this time, because the cooling air passes through the gaps 155c positioned inside of the hollow cylindrical portion 155B of the third pulley 155, not only the outer peripheral surface but also the inner peripheral surface of the third pulley 155 can be efficiently cooled. This is in high contrast to a case where the third pulley 155 has no gaps 155c. Further, since the third pulley 155 functions as the axial fan, an area of the cross-section taken along a plane perpendicular to the traveling direction of the transmission mechanism cooling air passage W2 can be increased, which leads to an increase in volume of the space where cooling is exerted. Particularly, the first to third pulleys 51, 53, and 155 and the bearings 61 and 62 those generating large amount of heat generation due to their driving operation can be efficiently cooled. The first, second, third pulleys 51, 53, and 155 and the bearings 61 and 62 those being targets to be cooled are examples of rotation members of the invention.

As described above, the motor cooling air passage W1 extending from the air introduction openings 48 toward the fifth opening 75 and the transmission mechanism cooling air passage W2 extending from sixth opening 76 toward the fourth opening 74 through the inside of the hollow cylindrical portion 155B of the third pulley 155 are provided in the housing 140. The motor 6, the fourth pulley 56, and the part of the second belt 57 are located in the motor cooling air passage W1. Therefore, these components can be cooled directly by the cooling air, and the heat generated by the driving operation of these components can be efficiently dissipated. On the other hand, the part of the second belt 57, the first to the third pulleys 51, 53, 155, the first belt 54, and the bearings 61 and 62 are located in the transmission mechanism cooling air passage W2. Therefore, these components can be directly cooled by the cooling air which has been drawn from the outside and has not been heated by the exhaust heat produced by the motor 6. Accordingly, heat generated in these components due to their driving can be efficiently dissipated.

Therefore, deterioration of the first pulley 51 and the bearings 61 and 62 which are subjected to the heaviest loads in the transmission mechanism 5 can be prevented, which contributes to prolongation of service life. Further, the cooling air passing through the motor cooling air passage W1 and the transmission mechanism cooling air passage W2 can move past the all components which are driven during the operation, such as the motor 6 and the saw blade 41 in addition to the transmission mechanism 5. Therefore, the inside of the housing 140 can be entirely cooled.

Next, a housing 240 of a miter saw 1 according to a fourth embodiment of the invention will be described with reference to FIGS. 12 through 14, wherein like parts and components are designated by the same reference numerals as those shown in the foregoing embodiments to avoid duplicating description. The fourth embodiment is different from the third embodiment in terms of the configuration of a first pulley 251 and a position of the opening formed in a gear case 244.

Figure 12:
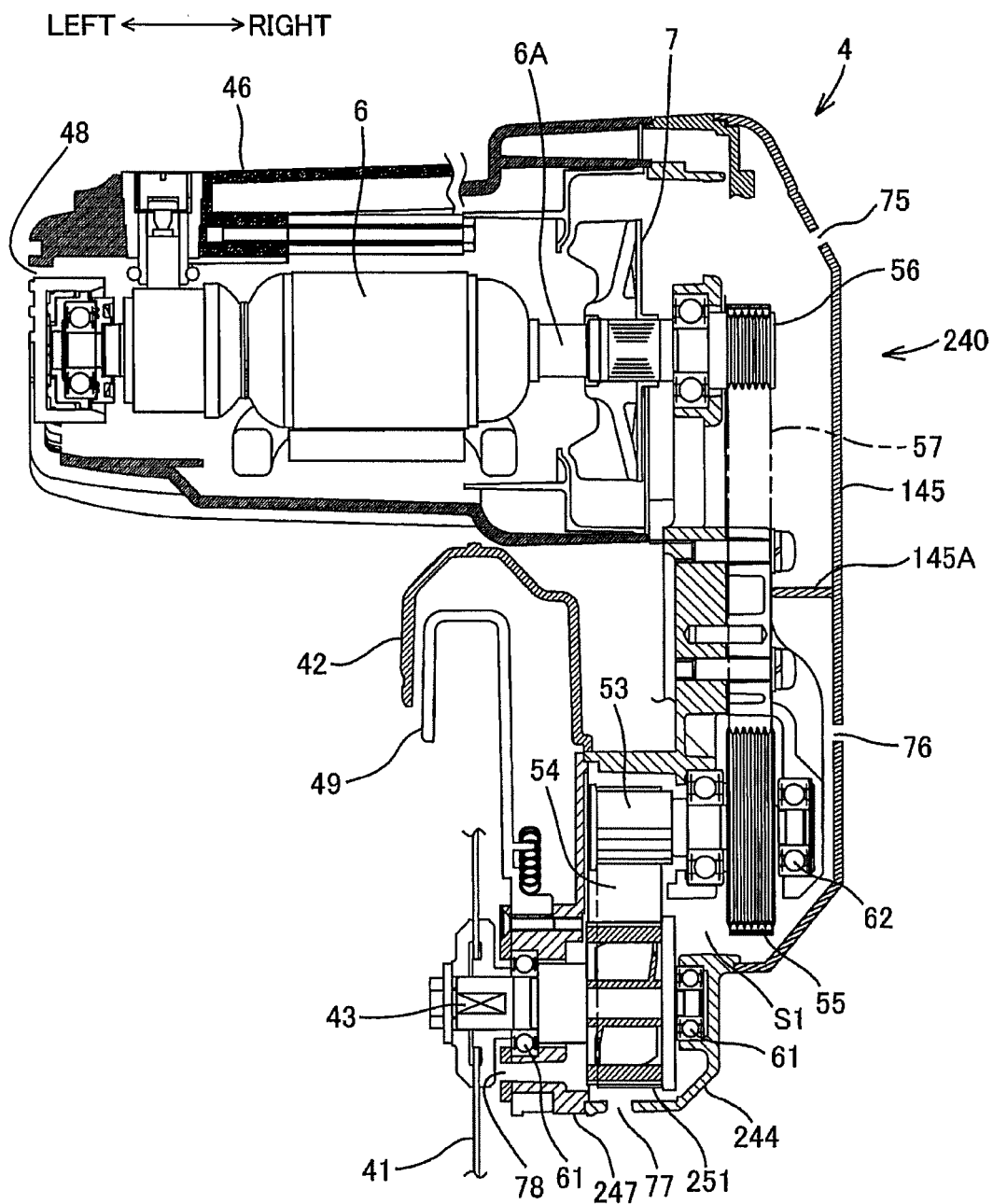
FIG. 12 is a cross-sectional view of a housing of a miter saw according to a fourth embodiment of the present invention.
Figure 13:
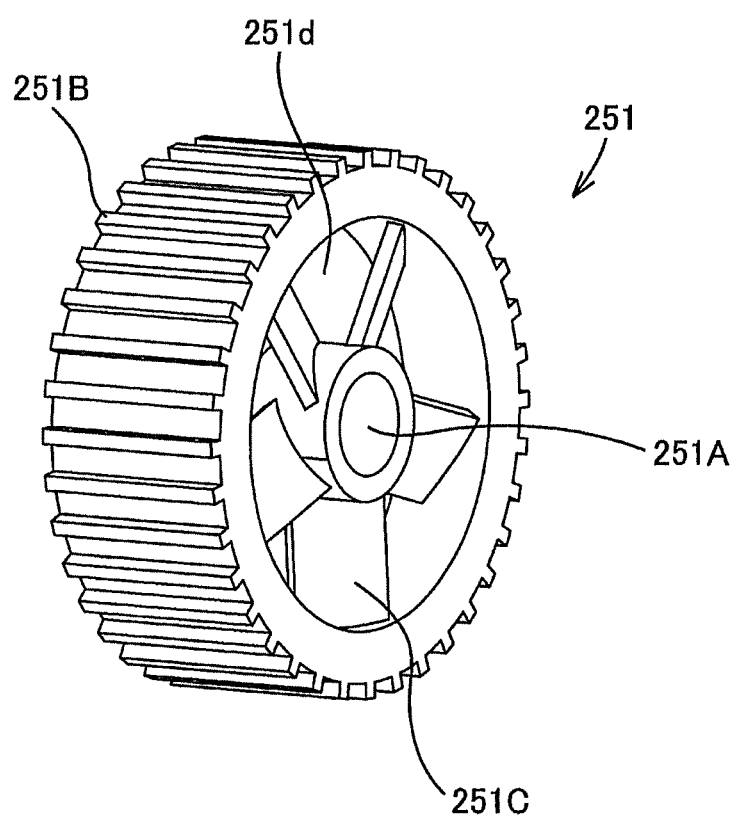
FIG. 13 is a perspective view of a timing pulley functioning as an axial fan.

As illustrated in FIG. 12, the housing 240 of the miter saw 1 includes the saw cover 42, the gear case 244, the main housing 145, and the motor housing 46. The gear case 244 is coupled to the saw cover 42 and has a shape for covering the spindle 43 as the rotation center of the saw blade 41. The main housing 145 is coupled to the gear case 244 to accommodate a part of the transmission mechanism 5. The motor housing 46 is coupled to the main housing 145 and has a shape for covering the motor 6.

The gear case 244 has a seventh opening 77 on an outer surface portion facing the workpiece W mounted on the base portion 2 and adjacent to the teethed surface of the first pulley 251. The seventh opening 77 is configured to function as the outlet port through which the inside of the gear case 244 is communicated with the outside of the gear case 244. The seventh opening 77 has the shape and the dimensions so that the cooling air discharged from the seventh opening 77 can be oriented toward the workpiece W. Further, a bearing holder 247 has an eighth opening 78 through which the gear case 244 is communicated with the outside of the gear case 244 through the bearing holder 247. The eighth opening 78 is open at the surface of the bearing holder 247 facing the saw blade 41.

In this embodiment, the first pulley 251 and the second pulley 53 are timing pulleys, respectively. The first belt 54 is a toothed pulley. Particularly, the first pulley 251 includes a core portion 251A, a hollow cylindrical portion 251B, and a plurality of blades 251C as illustrated in FIG. 13. The core portion 251A is coaxially fixed to the spindle 43. The first belt 54 is looped over the outer surface of the hollow cylindrical portion 251B. The plurality of blades 251C is positioned between the hollow cylindrical portion 251B and the core portion 251A and are arrayed in a circumferential direction with a gap 251d between neighboring blades. The outer surface of the hollow cylindrical portion 251B has a plurality of protrusions extending in the direction of rotation axis and arrayed in the circumferential direction with intervals. These protrusions function as teeth.

Each of the plurality of blades 251C extends in a radial direction so as to span from the core portion 251A to the hollow cylindrical portion 251B. Further, the plurality of blades 251C are arrayed in the circumferential direction with the gap 251d between neighboring blades. The plurality of blades 251C have the shape functioning as an axial fan upon rotation of the plurality of blades 251C about an axis of the core portion 251A. The rotating blades 251C generate an airflow passing through the gaps 251d and traveling toward the saw blade 41. Numbers and concrete shapes of the blades 155C are appropriately designed in accordance with the desired intensity of the cooling air generated by the first pulley 251 as the axial fan.

In this embodiment, in accordance with the rotation of the motor 6, the fourth pulley 56 is rotated together with the rotation of the output shaft 6A. The rotation of the fourth pulley 56 is transmitted to the third pulley 55 through the second belt 57, thereby rotating the third pulley 55. The second pulley 53 is rotated together with the rotation of the third pulley 55. The rotation of the second pulley 53 is transmitted to the first pulley 251 through the first belt 54, thereby rotating the first pulley 251. The spindle 43 is rotated together with the rotation of the first pulley 251, thereby rotating the saw blade 41. Consequently, the saw blade 41 can cut the workpiece W.

Figure 14:
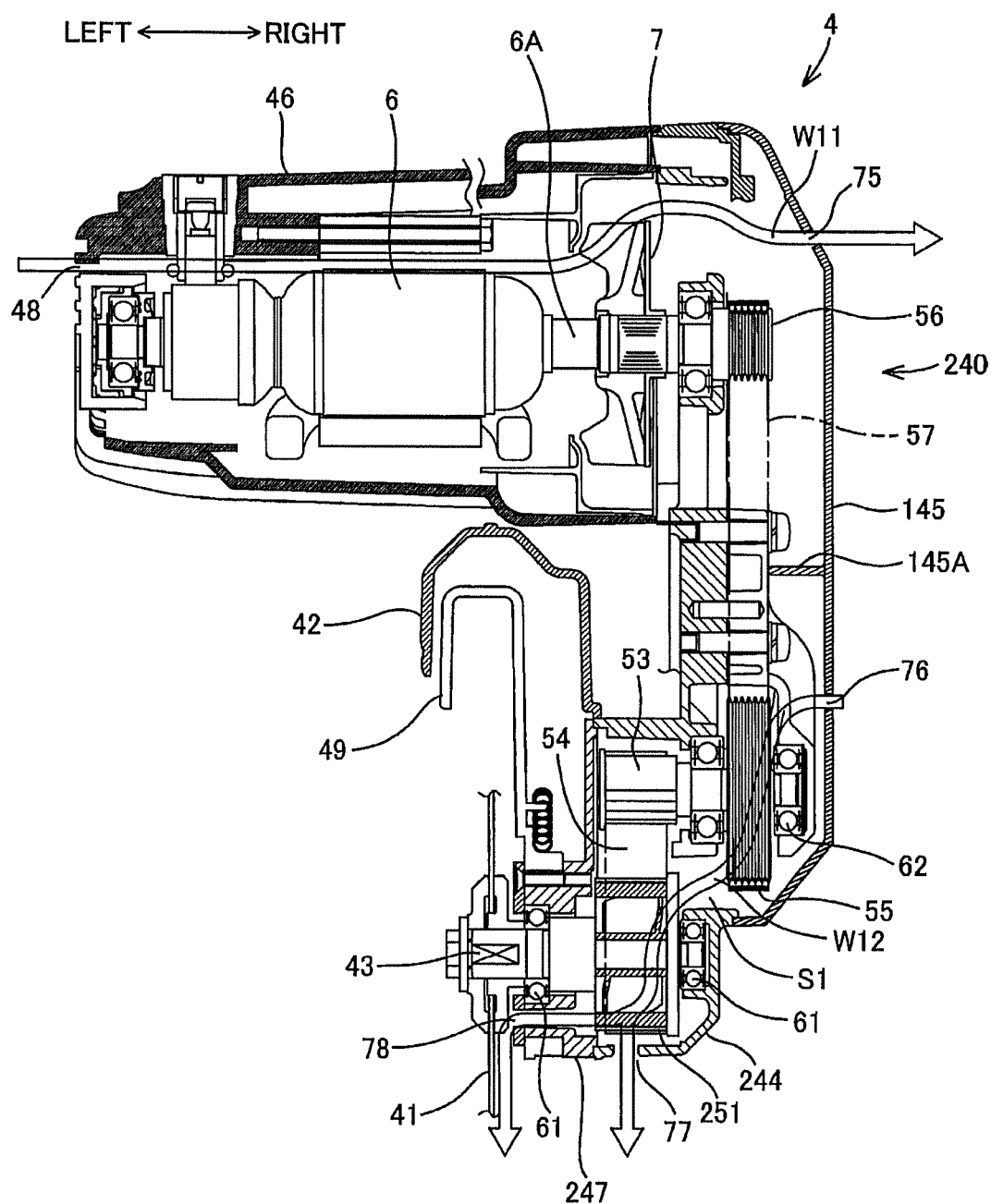
FIG. 14 is a cross-sectional view illustrating an air passage formed in the housing illustrated in FIG. 12.

At this time, as illustrated in FIG. 14, the rotation of the motor 6 leads to the rotation of the cooling fan 7. As a result, external air is drawn into the motor housing 46 through the air introduction openings 48 as the cooling air in accordance with the rotation of the cooling fan 7. The cooling air flows from the motor housing 46 to the main housing 45. Here, entry of the cooling air into the communicating space S1 is prevented because of the provision of the partition wall 145A, and thus, the cooling air flow is discharged outside of the housing 240 through the fifth opening 75. In other words, a motor cooling air passage W11 extending from the air introduction openings 48 to the fifth opening 75 is created in the housing 240, so that the cooling air passing through the motor cooling air passage W1 cools the motor 6, the fourth pulley 56, and a part of the second belt 57.

The first pulley 251 functions as the axial fan in accordance with the rotation of the first pulley 251. Hence, external air is introduced as the cooling air through the sixth opening 76. The cooling air moves past the outer peripheral surface of the third pulley 55, then passes through the communicating space S1, and passes through an inside of the hollow cylindrical portion 251B of the first pulley 251, and is discharged outside of the housing 240 through the seventh opening 77 and the eighth opening 78. In other words, a transmission mechanism cooling air passage W12 extending from the sixth opening 76 is created. The third pulley 55, the first pulley 251, and a part of the second pulley 53 is located in the air passage W12. The cooling air passing through the transmission mechanism cooling air passage W12 passes by the second belt 57, the third pulley 55, the second pulley 53, the first pulley 251, a part of the first belt 54, and the bearings 61 and 62, and is then discharged outside through the seventh opening 77 and the eighth opening 78.

At this time, because the cooling air passes through the gaps 251c of the hollow cylindrical portion 251B of the first pulley 251, the first pulley 251 is more efficiently cooled in comparison with a first pulley having no gaps 251c. Further, because the first pulley 251 functions as the axial fan, an increased area of cross-section of the transmission mechanism cooling air passage W12 taken along a plane perpendicular to the traveling direction of the transmission mechanism cooling air passage W12 can be obtained, thereby enlarging a space exhibiting a cooling effect. Particularly, the first pulley 251, the third pulley 55, and the bearings 61 and 62 those generating large amount of heat due to the driving can be efficiently cooled.

As described above, the motor cooling air passage W11 in which the cooling air travels from the air introduction openings 48 to the fifth opening 75 and the transmission mechanism cooling air passage W12 in which the cooling air travels from the sixth opening 76 to the seventh opening 77 or the eighth opening 78 are provided in the housing 240. Because the motor 6, the fourth pulley 56, and the part of the second belt 57 are positioned in the motor cooling air passage W11, these components can be directly cooled by the cooling air, so that heat generated in the driving components can be efficiently dissipated. On the other hand, the part of the second belt 57, the first pulley 251, the second pulley 53, the third pulley 55, the first belt 54, and the bearings 61 and 62 are positioned in the transmission mechanism cooling air passage W12. These components can be directly cooled by the cooling air drawn from the outside, the cooling air having not been heated by the waste heat of the motor 6. Hence, heat generated from these components due to their driving can be efficiently dissipated.

Accordingly, deterioration of the first pulley 251 and the bearings 61 and 62 which are subjected to the heaviest loads in the transmission mechanism 5 can be restrained, and prolonged service life is attainable. Further, cooling air moves past all rotating components during operation such as the motor 6 and the saw blade 41 in addition to the transmission mechanism 5, thereby cooling the inside of the housing 240 entirely.

Figure 15:
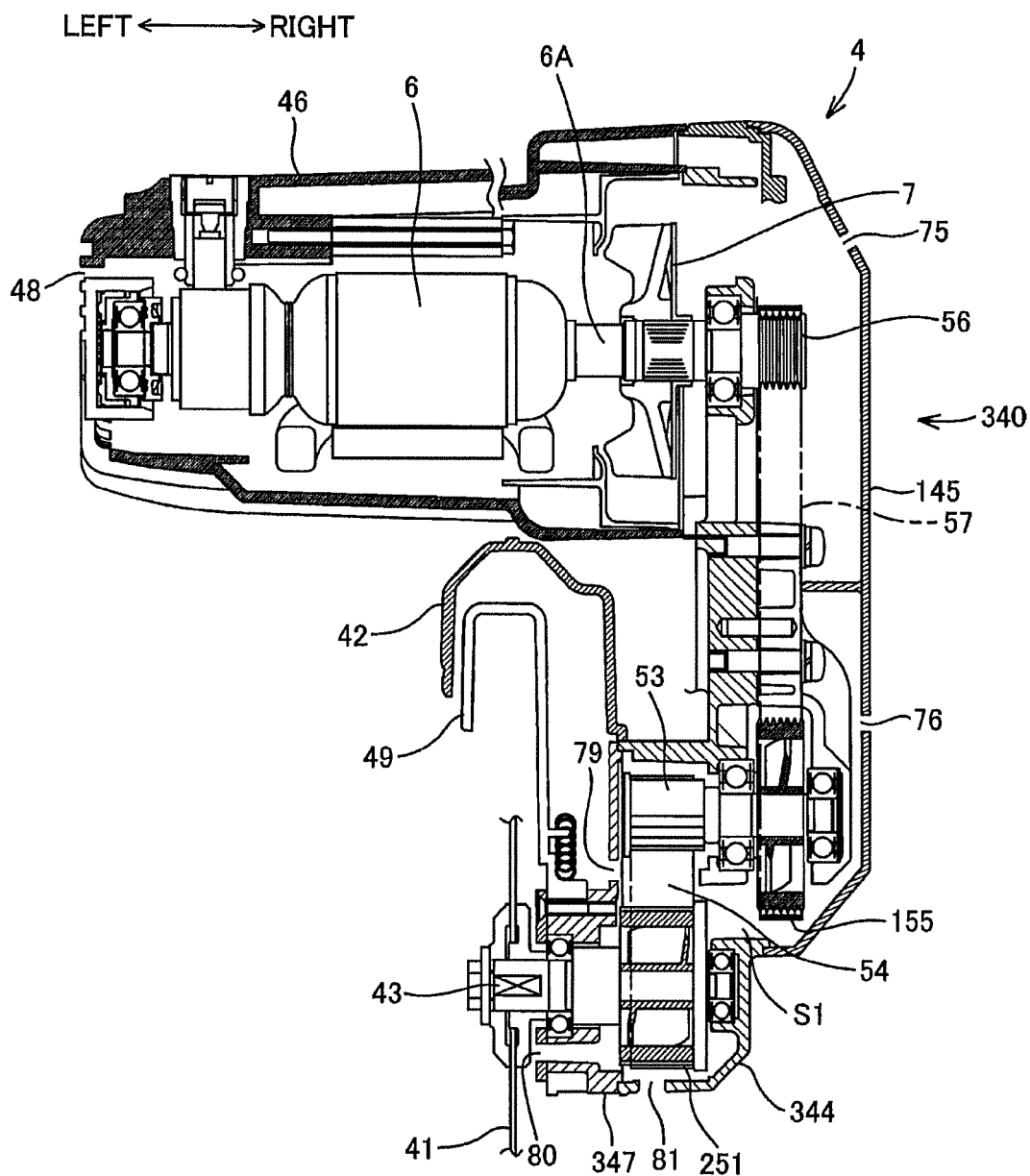
FIG. 15 is a cross-sectional view of a housing of a miter saw according to a fifth embodiment of the present invention.

Next, a housing 340 of a miter saw according to a fifth embodiment of the invention will be described with reference to FIGS. 15 and 16 wherein like parts and components are designated by the same reference numerals as those shown in the foregoing embodiments to avoid duplicating description. The fifth embodiment is different from the third and fourth embodiments in that the first pulley 251 of the fourth embodiment and functioning as the axial fan is the first pulley of the fifth embodiment, and that the third pulley 155 of the third embodiment and functioning as the axial fan is the third pulley of the fifth embodiment. A gear case 344 has an opening 81. A bearing holder 347 has openings 79 and 80. The opening 79 of the bearing holder 347 opens at the outer surface facing the saw blade 41 at an intermediate position between the first pulley 251 and the second pulley 53. The opening 80 is formed in the bearing holder 347 at a position opposite to the opening 79 with respect to the spindle 43 and is open to the saw blade 41. The opening 81 is formed in the gear case 344 at a position facing the hollow cylindrical portion 251B of the first pulley 251. The openings 79, 80, and 81 function as outlet ports for the cooling air upon actuation of the motor 6.

Figure 16:
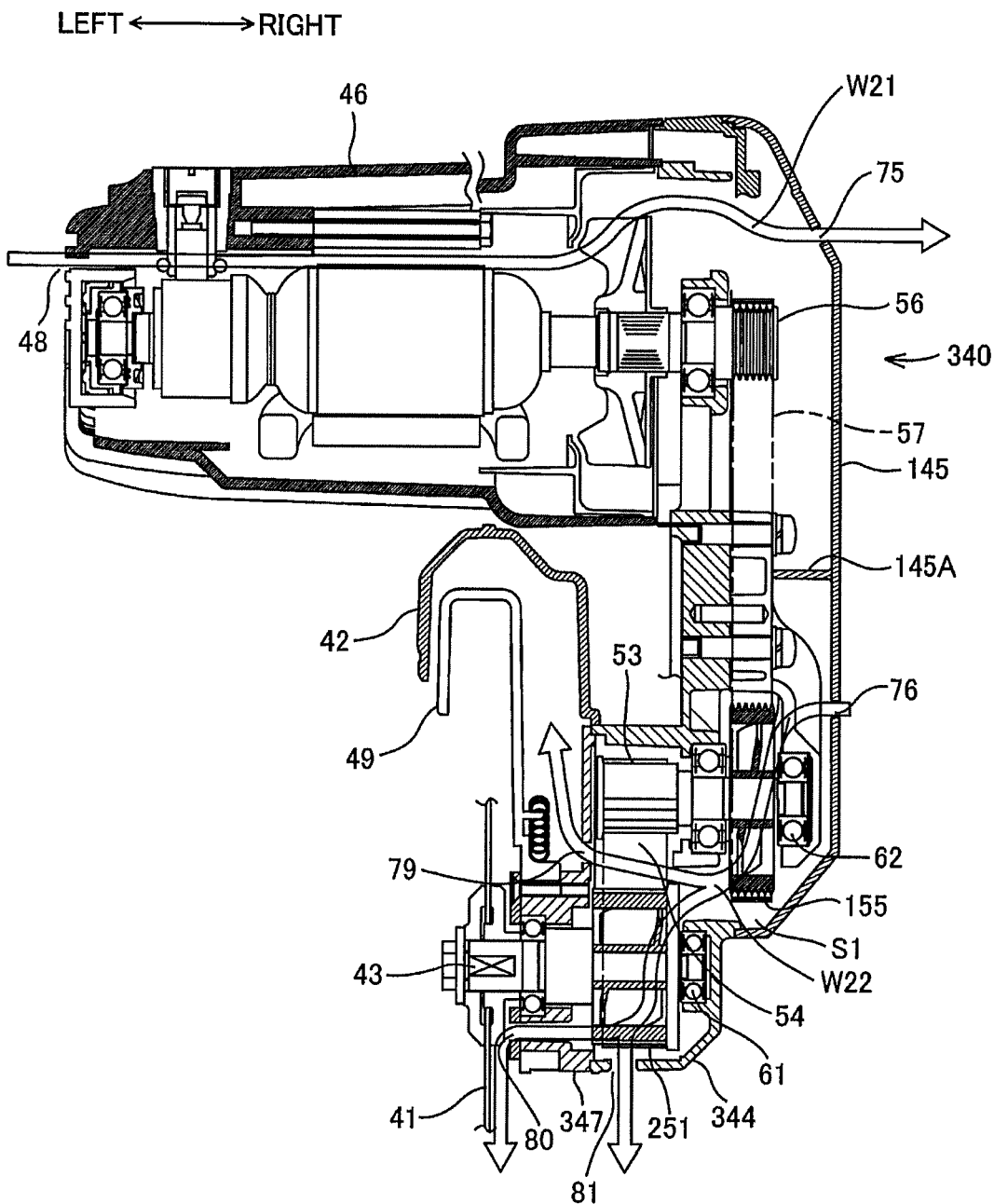
FIG. 16 is a cross-sectional view of an air passage formed in the housing illustrated in FIG. 15.

In the fifth embodiment, in accordance with the rotation of the motor, the cooling fan 7 is rotated, so that external air is drawn as the cooling air into the motor housing 46 through the air introduction openings 48 as illustrated in FIG. 16. The cooling air flows from the motor housing 46 to the main housing 145, but the cooling air is blocked by the partition wall 145A from entering the communicating space S1. Thus, the cooling air is discharged outside of the housing 340 through the fifth opening 75. In other words, a motor cooling air passage W21 is created from the air introduction openings 48 to the fifth opening 75 in the housing 340. The cooling air passing through the motor cooling air passage W21 cools the motor 6, the fourth pulley 56, and a part of the second belt 57 those positioned in the motor cooling air passage W21.

Further, in accordance with the rotation of the third pulley 155, the third pulley 155 functions as an axial fan to produce an airflow oriented to the second pulley 53, so that external air is drawn as the cooling air through the sixth opening 76. The introduced airflow passes through the gaps 155d of the hollow cylindrical portion 155B of the third pulley 155, and the airflow passes through the space between the first and second pulleys 251 and 53, and is discharged outside of the housing 340 through the openings 79, 80, and 81. In other words, a transmission mechanism cooling air passage W22 extends from the sixth opening 76 is created, and the third pulley 155, the second pulley 53, and the first pulley 251 are positioned in the air passage W22. The cooling air passing through the transmission mechanism cooling air passage W22 moves past the third pulley 155, the second pulley 53, the first pulley 251, the first belt 54, and the bearings 61 and 62, and is discharged outside through the openings 79, 80, and 81.

At this time, because the cooling air passes through the gaps 155c of the hollow cylindrical portion 155B of the third pulley 155, the cooling air more efficiently cools the third pulley 155 from both the outer peripheral surface and the inner peripheral surface of the third pulley 155 in compared with a third pulley having no gaps 155c. Further, as the third pulley 155 functions as the axial fan, an increased area of cross-section of the transmission mechanism cooling air passage W22 taken along a plane perpendicular to the traveling direction of the cooling air can be obtained. Accordingly, an enlarged space exhibiting cooling effect can be provided, and the first pulley 251, the second pulley 53, the third pulley 155, and the bearings 61 and 62 those producing large amount of heat due to their driving can be efficiently cooled.

In the transmission mechanism cooling air passage W22, the first pulley 251 and the third pulley 155 function as axial fans in interlocking relation therebetween for generating the cooling air oriented toward the saw blade 41. In other words, two fans cooperate with each other in the transmission mechanism cooling air passage W22 to generate the cooling air, so that the intensity of the cooling air can be increased, thereby increasing cooling effect with respect to the first pulley 251, the third pulley 155, and the bearings 61 and 62. Thus, degradation of these components due to heat accumulation can be avoided.

Figure 17:
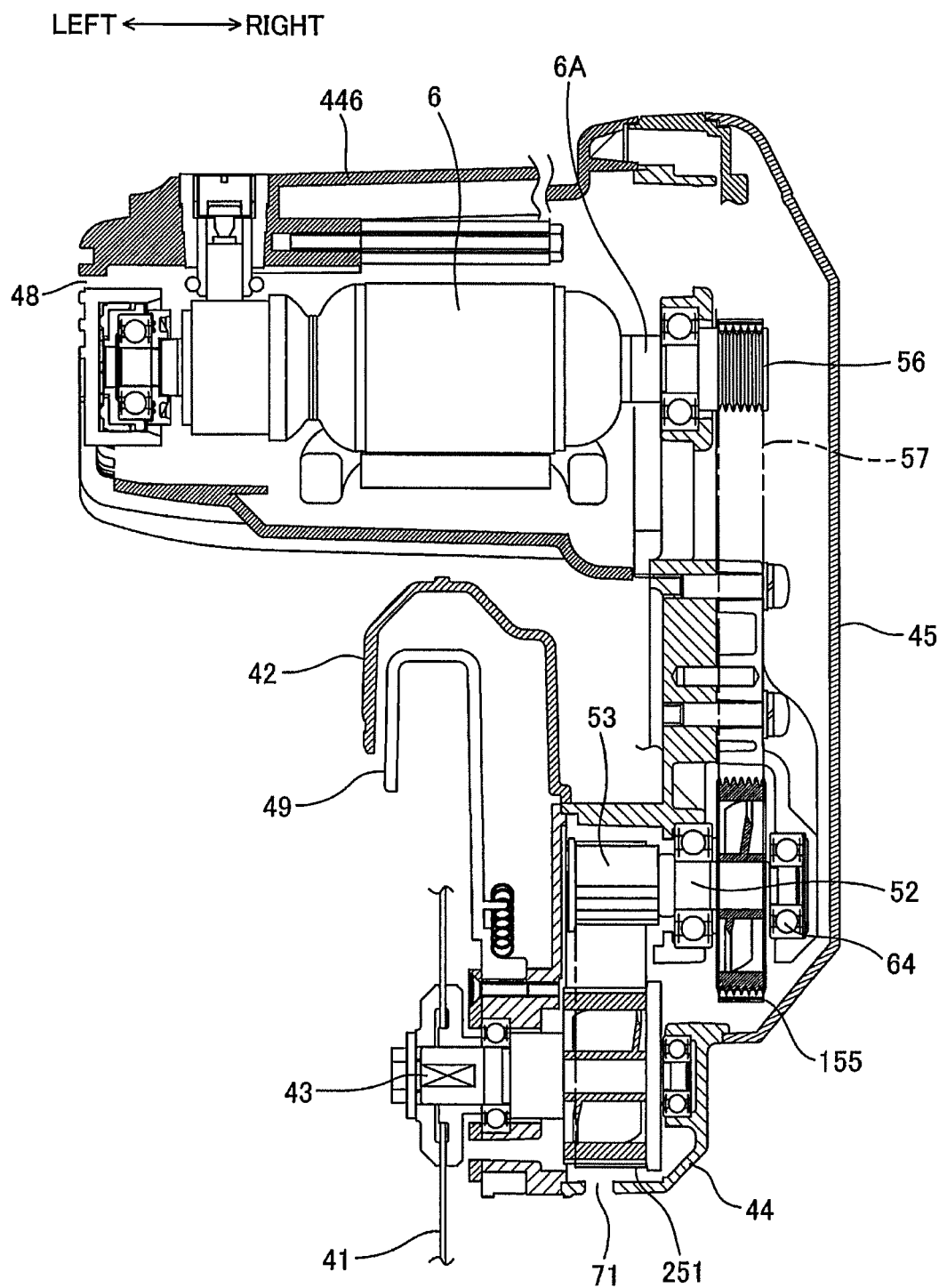
FIG. 17 is a cross-sectional view of a housing of a miter saw according to a sixth embodiment of the present invention.

Next, a housing of a miter saw according to a sixth embodiment of the invention will be described with reference to FIG. 17. A housing 440 according to the sixth embodiment has no cooling fan 7 which is used in the housing 40 of the first embodiment. The first pulley 251 functioning as the axial fan is used as the first pulley. The third pulley 155 functioning as the axial fan is used as the third pulley. A motor housing 446 of the housing 440 is formed smaller than the motor housing 46 of the foregoing embodiments, because the motor housing 446 has no cooling fan.

In the sixth embodiment, in accordance with the rotation of the motor 6, the first pulley 251 and the third pulley 155 of the transmission mechanism 5 are rotated, thereby generating an airflow traveling toward the saw blade 41. As the main housing 45 has no opening, external air is drawn into the motor housing 446 through the air introduction openings 48 as the cooling air. The cooling air travels toward the gear case 44 through the motor housing 446 and the main housing 45. The cooling air passes inside of the hollow cylindrical portion 155B of the third pulley 155 and inside of the hollow cylindrical portion 251B of the first pulley 251, and is discharged outside of the housing 40 through the opening 71.

As described above, because two pulleys 155 and 251 functioning as the axial fans are provided, a large amount of cooling air can be generated in the housing 40 without the cooling fan 7 connected to the motor 6. Accordingly, components constituting the motor 6 and the transmission mechanism 5 can be efficiently cooled.

Further, as the cooling fan 7 is omitted, the length of the output shaft 6A of the motor 6 can be shortened. Consequently, the length of the motor housing 446 in the direction of rotation axis of the saw blade 41 can be made shorter. Therefore, the housing 440 can be made compact, so that the tilting angular range of the miter saw 1 can be increased. Consequently, operability of the miter saw 1 can be improved.

Figure 18:
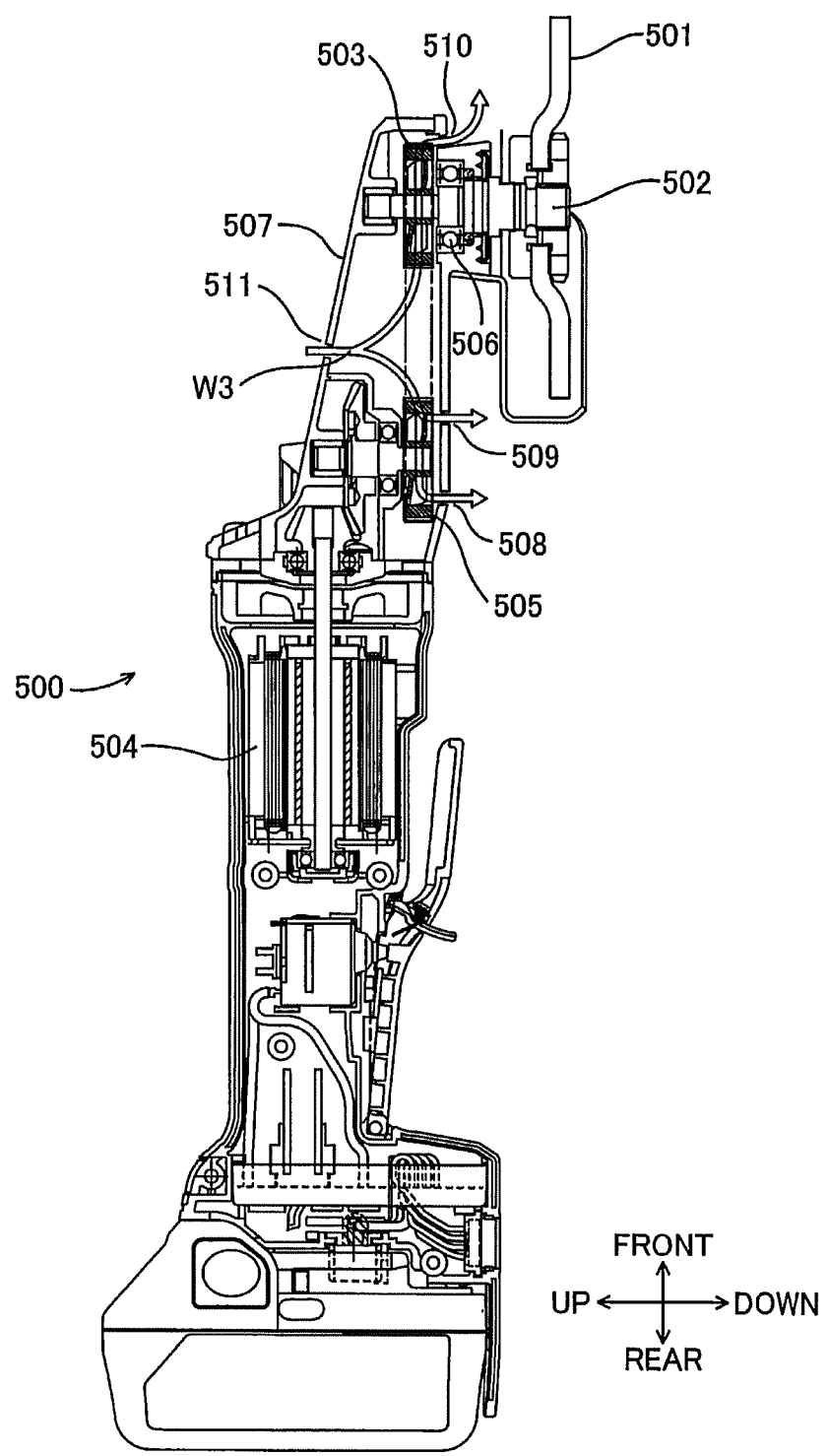
FIG. 18 is a cross-sectional view of a housing of a miter saw according to a seventh embodiment of the present invention.

Next, a seventh embodiment of the invention will be described with reference to FIG. 18. FIG. 18 illustrates a cross-section of a disc grinder 500 to which the present invention is applied.

In the disc grinder 500 illustrated in FIG. 18, a pulley 503 is attached to an output shaft 502 to which a disc 501 as an end bit is attached instead of attachment of conventional gear train as a final decelerating portion to the output shaft 502. Further, a belt driving mechanism is used for rotating the disc 501. The belt driving mechanism includes a pulley 505 mechanically connected to tan output shaft of a motor 504, and a belt looped over the pulleys 503 and the 505. The pulley 503 and the pulley 505 are similar to the pulleys used on the third through fifth embodiments. That is the pulley includes a hollow cylindrical portion over which the belt is looped, a core portion, and a plurality of blades positioned inside the hollow cylindrical portion and extending radially outward from the core portion. These pulleys 503 and 505 function as axial fans upon rotation in addition to inherent function of pulleys. A housing 507 has an outer surface portion facing the disc 501, and in the outer surface portion openings 508, 509, and 510 are formed at positions adjacent to the pulleys 505 and 503. The housing 507 has an opposite outer surface portion where an opening 511 is formed.

In accordance with the rotation of the motor 504, the pulley 503 and the pulley 505 are rotated, and as a result, an air passage W3 having the opening 511 as the intake port and the openings 508, 509, and 510 as outlet ports is created in the housing 507. The output shaft 502 rotating at high speed, a bearing 506 rotatably supporting the output shaft 502, and the pulleys 503 and 505 are positioned in the air passage W3, so that these components are directly cooled. Accordingly, a compact power transmission mechanism from the motor 504 to the disc 501 can be provided, and each component can be efficiently cooled, thereby avoiding degradation of these components.

According to the foregoing embodiments, the invention is applied to the miter saw and a disk grinder. However, the present invention can be applied to not only the miter saw and the disk grinder but also to any type of power tool where rotation of the motor is transmitted to the output shaft through the transmission mechanism for operating the end bit.

REFERENCE SIGNS LIST

1: miter saw, 5: transmission mechanism, 6: motor, 7: cooling fan, 40: housing, 41: saw blade, 43: spindle, 44: gear case, 45: main housing, 46: motor housing, 51, 251: first pulley, 52: pulley shaft, 54: first belt, 55, 155: third pulley, P, W1, W2, W3, W11, W12, W21, W22: air passage

The invention claimed is:
1. A power tool comprising:
a motor;
a fan configured to be rotated by the motor to generate a cooling air;
a housing accommodating therein the motor and the fan and defining an air passage for the cooling air;
an output shaft rotatable by the motor, an end bit being attachable to and detachable from the output shaft; and
a transmission mechanism configured to transmit rotation of the motor to the output shaft; and
a bearing,
wherein the transmission mechanism comprises an intermediate shaft provided in the housing and supported by the bearing, a first belt transmitting a rotational force of the motor to the intermediate shaft, a second belt transmitting a rotational force of the intermediate shaft to the output shaft, and a rotation member transmitting a rotational force of the second belt to the output shaft, and
wherein the housing comprises:
a motor accommodating portion accommodating the motor;
a first belt accommodating portion accommodating the first belt, the first belt accommodating portion being in communication with the motor accommodating portion;

a second belt accommodating portion accommodating the second belt, the second belt accommodating portion being in communication with the first belt accommodating portion;

a communicating space formed at a position outward of the bearing in a radial direction of the bearing, the communicating space being in communication with the first and second belt accommodating portions; and an airflow passage that directs the cooling air from an intake port, through the motor accommodating portion, the first belt accommodating portion, the communicating space, and the second belt accommodating portion, to an outlet port.

2. The power tool according to claim 1,
wherein the housing comprises a case accommodating therein the rotation member,
wherein the case has a port through which the cooling air is drawn into the case, and the outlet port through which the cooling air is discharged outside the case, and
wherein the case provides a space between the port and the outlet port, and the air passage includes the space where the rotation member is positioned.

3. The power tool according to claim 2, wherein the rotation member is a pulley.

4. The power tool according to claim 3, wherein the transmission mechanism further comprises a first pulley configured to rotate in synchronization with the motor a second pulley and a third pulley, each of the second pulley and the third pulley being rotatable about an axis of the intermediate shaft,
wherein the first belt is looped over the first pulley and the second pulley, and the second belt is looped over the third pulley and the pulley, and
wherein the first pulley, the second pulley, and the third pulley are positioned inside the space through which the cooling air passes.

5. The power tool according to claim 2,
wherein a working space is defined between the case and a workpiece to be machined by the end bit,
wherein the outlet port is positioned in the case to face at least one of the end bit and the working space, and
wherein the cooling air is discharged toward the end bit or the working space.

6. The power tool according to claim 2,
wherein the intake port is open to a space in the housing,
wherein the housing has an air introduction opening,
wherein the air passage is in communication with the air introduction opening and extends to the outlet port through the intake port, and
wherein the air introduction opening is positioned opposite to the outlet port with respect to the output shaft.

7. The power tool according to claim 2, wherein the intake port and the outlet port are positioned remote from each other in a direction parallel to or orthogonal to a rotation axis of the rotation member, and
wherein the rotation member is positioned between the outlet port and the intake port.

8. The power tool according to claim 1, wherein the rotation member further comprises a bearing rotatably supporting the output shaft.

9. The power tool according to claim 1,
wherein the housing further comprises a second belt accommodating portion accommodating the second belt, the second belt accommodating portion having an air hole, and
wherein the communicating space and the air hole are positioned remote from each other in an axial direction of the output shaft.

10. The power tool according to claim 1, wherein the cooling air passes through the communicating space after passing through the airflow passage.

11. The power tool according to claim 1, wherein the second belt is positioned between the first belt and the end bit in an axial direction of the output shaft.

12. The power tool according to claim 1,
wherein the transmission mechanism further comprises a first pulley configured to rotate in synchronization with the motor, a second pulley, and a third pulley, each of the second pulley and the third pulley being rotatable about an axis of the intermediate shaft,
wherein the rotation member is a pulley,
wherein the first belt is looped over the first pulley and the second pulley, and the second belt is looped over the third pulley and the pulley, and
wherein the bearing is positioned between the second pulley and the third pulley in an axial direction of the output shaft.

* * * * *